US012547087B2

(12) United States Patent
Maruyama et al.

(10) Patent No.: US 12,547,087 B2
(45) Date of Patent: Feb. 10, 2026

(54) ELECTROPHOTOGRAPHIC APPARATUS AND PROCESS CARTRIDGE

(71) Applicant: CANON KABUSHIKI KAISHA, Tokyo (JP)

(72) Inventors: Akihiro Maruyama, Shizuoka (JP); Masashi Nishi, Kanagawa (JP); Norifumi Muranaka, Kanagawa (JP); Tsutomu Nishida, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/924,842

(22) Filed: Oct. 23, 2024

(65) Prior Publication Data

US 2025/0138442 A1 May 1, 2025

(30) Foreign Application Priority Data

Oct. 31, 2023 (JP) ................................ 2023-187003
Oct. 9, 2024 (JP) ................................ 2024-177323

(51) Int. Cl.
*G03G 5/05* (2006.01)
*G03G 5/06* (2006.01)
(Continued)

(52) U.S. Cl.
CPC ......... *G03G 5/0546* (2013.01); *G03G 5/0661* (2013.01); *G03G 9/08711* (2013.01);
(Continued)

(58) Field of Classification Search
CPC ............... G03G 5/0546; G03G 5/0661; G03G 9/08711; G03G 9/08755; G03G 9/09328;
(Continued)

(56) References Cited

U.S. PATENT DOCUMENTS 10,838,314 B2 * 11/2020 Ikezue ................. G03G 5/0564
2018/0143555 A1 5/2018 Nishitera
(Continued)

FOREIGN PATENT DOCUMENTS

JP 2021001970 A 1/2021
JP 2023019706 A 2/2023
WO 2015129448 A1 9/2015

*Primary Examiner* — Joseph S Wong
(74) *Attorney, Agent, or Firm* — Canon U.S.A., Inc. IP Division

(57) ABSTRACT

An electrophotographic apparatus including an electrophotographic photosensitive member, a charging unit that charges a surface of the electrophotographic photosensitive member, an exposing unit that irradiates the charged surface of the electrophotographic photosensitive member with light to form an electrostatic latent image on the surface of the electrophotographic photosensitive member, and a developing unit, which includes toner, and which develops the electrostatic latent image formed on the surface of the electrophotographic photosensitive member with the toner to form a toner image on the surface of the electrophotographic photosensitive member. The electrophotographic photosensitive member includes a monolayer type photosensitive layer containing a charge generating substance, a hole transporting substance, an electron transporting substance, and a binder resin. The photosensitive layer contains, as the binder resin, a polyarylate resin having a structural unit represented by the following formula (1) and a structural unit represented by the following formula (2).

(1)

(Continued)

-continued

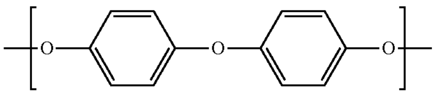

(2)

18 Claims, 4 Drawing Sheets

(51) Int. Cl.

| | |
|---|---|
| ***G03G 9/087*** | (2006.01) |
| ***G03G 9/093*** | (2006.01) |
| ***G03G 21/18*** | (2006.01) |

(52) U.S. Cl.
CPC ..... *G03G 9/08755* (2013.01); *G03G 9/09328* (2013.01); *G03G 21/1814* (2013.01); *G03G 2215/00957* (2013.01); *G03G 2215/00962* (2013.01)

(58) Field of Classification Search
CPC ..... G03G 21/1814; G03G 2215/00957; G03G 2215/00962
See application file for complete search history.

(56) References Cited

U.S. PATENT DOCUMENTS

2021/0286283 A1 9/2021 Nagaoka
2023/0093328 A1* 3/2023 Nishi ..................... G03G 5/047 430/76
2023/0097281 A1* 3/2023 Otsubo .................. G03G 15/75 430/58.25

* cited by examiner

ELECTROPHOTOGRAPHIC APPARATUS AND PROCESS CARTRIDGE

BACKGROUND

Field

The present disclosure relates to an electrophotographic apparatus using an electrophotographic photosensitive member and toner, and a process cartridge.

Description of the Related Art

In recent years, there has been a demand for an electrophotographic apparatus having a longer service life and higher image quality, and it has been desired to provide an apparatus that outputs an image with high quality stability at the time of repeated use (after endurance).

An organic electrophotographic photosensitive member (hereinafter sometimes simply referred to as "electrophotographic photosensitive member" or "photosensitive member") containing an organic photoconductive substance (charge generating substance) is used as an electrophotographic photosensitive member to be mounted on an electrophotographic apparatus or a process cartridge. In a recent electrophotographic apparatus, in addition to the above-mentioned measures for extending the service life, there has been a demand that high image quality be maintained from an initial stage to a stage after endurance by suppressing a decrease in transfer efficiency after endurance to improve image quality.

Meanwhile, toner having a core-shell structure is sometimes used for the purpose of improving the positive chargeability and charging stability of the toner in maintaining high image quality from an initial stage to a stage after endurance. For example, in International Publication No. WO2015/129448, there has been proposed toner using a melamine resin for a shell. In addition, in Japanese Patent Application Laid-Open No. 2021-001970, there has been proposed toner using a shell containing an oxazoline group.

According to investigations made by the inventors of the present disclosure, in an image forming apparatus using the toner as described in International Publication No. WO2015/129448 or Japanese Patent Application Laid-Open No. 2021-001970 for the purpose of suppressing a decrease in transfer efficiency after endurance, the transfer efficiency after endurance is decreased, and hence there has been a room for improvement.

SUMMARY

Thus, an aspect of the present disclosure is to provide an excellent electrophotographic apparatus in which a decrease in transfer efficiency after endurance is suppressed and high image quality is maintained from an initial stage to a stage after endurance in an electrophotographic apparatus using toner having a core-shell structure.

The above-mentioned aspect is achieved by the present disclosure to be described below. That is, an electrophotographic apparatus according to the present disclosure is an electrophotographic apparatus including: an electrophotographic photosensitive member; a charging unit configured to charge a surface of the electrophotographic photosensitive member; an exposing unit configured to irradiate the charged surface of the electrophotographic photosensitive member with light to form an electrostatic latent image on the surface of the electrophotographic photosensitive member; a developing unit, which includes toner, and which is configured to develop the electrostatic latent image formed on the surface of the electrophotographic photosensitive member with the toner to form a toner image on the surface of the electrophotographic photosensitive member; and a transfer unit configured to transfer the toner image from the surface of the electrophotographic photosensitive member onto a transfer target member, wherein the electrophotographic photosensitive member includes a monolayer type photosensitive layer containing a charge generating substance, a hole transporting substance, an electron transporting substance, and a binder resin, wherein the photosensitive layer contains, as the binder resin, a polyarylate resin having a structural unit represented by the following formula (1) and a structural unit represented by the following formula (2), wherein the toner contains a toner particle, wherein the toner particle includes a core containing a binder resin and a shell covering a surface of the core, and wherein the shell contains at least one resin selected from the group consisting of: a melamine resin; and a resin having a structural unit represented by the following formula (3):

(1)

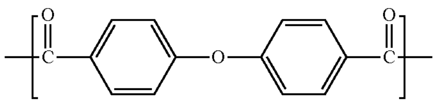

(2)

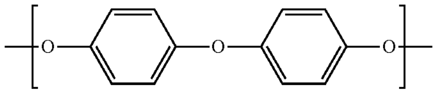

(3)

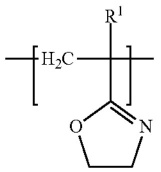

in the formula (3), $R^1$ represents a hydrogen atom, or a substituted or unsubstituted alkyl group having 1 or more and 10 or less carbon atoms.

In addition, a process cartridge according to the present disclosure is a process cartridge including: an electrophotographic photosensitive member; and a developing unit, which includes toner, and which is configured to form a toner image on a surface of the electrophotographic photosensitive member with the toner, the process cartridge integrally supporting the electrophotographic photosensitive member and the developing unit, and being detachably attachable onto a main body of an electrophotographic apparatus, wherein the electrophotographic photosensitive member includes a monolayer type photosensitive layer containing a charge generating substance, a hole transporting substance, an electron transporting substance, and a binder resin, wherein the photosensitive layer contains, as the binder resin, a polyarylate resin having a structural unit represented by the following formula (1) and a structural unit represented by the following formula (2), wherein the toner contains a toner particle, wherein the toner particle includes a core containing a binder resin and a shell covering a surface of the core, and wherein the shell contains at least one resin selected from the group consisting of: a melamine resin; and a resin having a structural unit represented by the following formula (3):

(1)

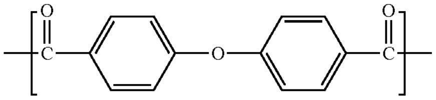

(2)

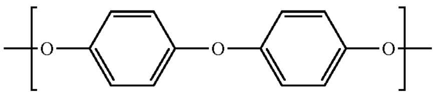

(3)

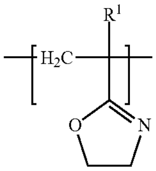

in the formula (3), $R^1$ represents a hydrogen atom, or a substituted or unsubstituted alkyl group having 1 or more and 10 or less carbon atoms.

Further features of the present disclosure will become apparent from the following description of exemplary embodiments with reference to the attached drawings.

DESCRIPTION OF THE EMBODIMENTS

Figure 1:
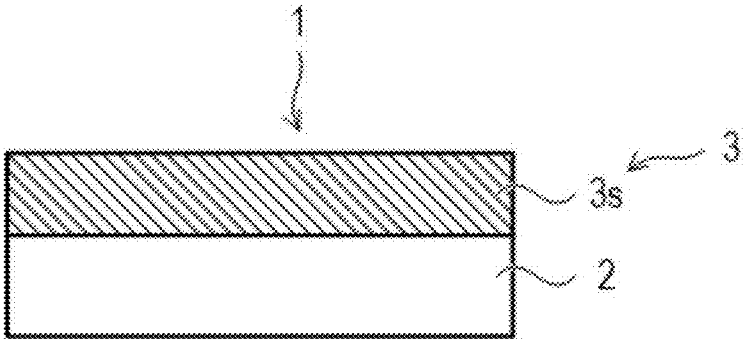
FIG. 1 is a view for illustrating an example of a layer configuration of an electrophotographic photosensitive member in the present disclosure.

The present disclosure is described below in detail by way of exemplary embodiments.

It has been found that, when an endurance test is performed in an image forming apparatus using the toner having a core-shell structure as described in International Publication No. WO2015/129448 or Japanese Patent Application Laid-Open No. 2021-001970, a decrease in transfer efficiency occurs. It is conceivable from the foregoing that even the toner having a core-shell structure that improves positive chargeability and charging stability undergoes stress caused by friction between the toner and a charging member along with endurance, and a shell structure is partially peeled off, resulting in decreases in positive chargeability and charging stability of the toner. It is assumed that the decreased positive chargeability of the toner causes the toner to remain on an electrophotographic photosensitive member as transfer residual toner when being developed on the electrophotographic photosensitive member and transferred therefrom, resulting in a decrease in transfer efficiency.

Based on the above-mentioned assumption, the inventors of the present disclosure have made various investigations on a method of maintaining high image quality from an initial stage to a stage after endurance by suppressing a decrease in transfer efficiency after endurance in an electrophotographic apparatus using toner having a core-shell structure. As a result, the inventors have achieved the configuration of the present disclosure.

An electrophotographic apparatus according to the present disclosure is an electrophotographic apparatus including: an electrophotographic photosensitive member; a charging unit configured to charge a surface of the electrophotographic photosensitive member; an exposing unit configured to irradiate the charged surface of the electrophotographic photosensitive member with light to form an electrostatic latent image on the surface of the electrophotographic photosensitive member; a developing unit, which includes toner, and which is configured to develop the electrostatic latent image formed on the surface of the electrophotographic photosensitive member with the toner to form a toner image on the surface of the electrophotographic photosensitive member; and a transfer unit configured to transfer the toner image from the surface of the electrophotographic photosensitive member onto a transfer target member, wherein the electrophotographic photosensitive member includes a monolayer type photosensitive layer containing a charge generating substance, a hole transporting substance, an electron transporting substance, and a binder resin, wherein the photosensitive layer contains, as the binder resin, a polyarylate resin having a structural unit represented by the following formula (1) and a structural unit represented by the following formula (2), wherein the toner contains a toner particle, wherein the toner particle includes a core containing a binder resin and a shell covering a surface of the core, and wherein the shell contains at least one resin selected from the group consisting of: a melamine resin; and a resin having a structural unit represented by the following formula (3):

(1)

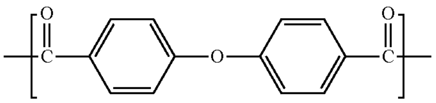

(2)

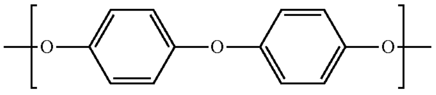

(3)

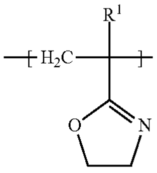

in the formula (3), $R^1$ represents a hydrogen atom, or a substituted or unsubstituted alkyl group having 1 or more and 10 or less carbon atoms.

An electrophotographic apparatus according to the present disclosure is an electrophotographic apparatus including: an electrophotographic photosensitive member; a charging unit configured to charge a surface of the electrophotographic photosensitive member; an exposing unit configured to irradiate the charged surface of the electrophotographic photosensitive member with light to form an electrostatic latent image on the surface of the electrophotographic photosensitive member; a developing unit, which includes toner, and which is configured to develop the electrostatic latent image formed on the surface of the electrophotographic photosensitive member with the toner to form a toner image on the surface of the electrophotographic photosensitive member; and a transfer unit configured to transfer the toner image from the surface of the electrophotographic photosensitive member onto a transfer target member, wherein the electrophotographic photosensitive member includes a monolayer type photosensitive layer containing a charge generating substance, a hole transporting substance, an electron transporting substance, and a binder resin, wherein the photosensitive layer contains, as the binder resin, a polyarylate resin having a structural unit represented by the following formula (1) and a structural unit represented by the following formula (2), wherein the toner contains a toner particle, and wherein a surface of the toner particle contains at least one resin selected from the group consisting of: a melamine resin; and a resin having a structural unit represented by the following formula (3):

(1)

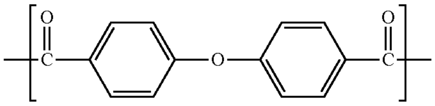

(2)

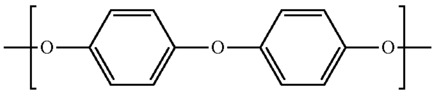

(3)

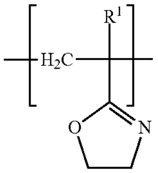

in the formula (3), $R^1$ represents a hydrogen atom, or a substituted or unsubstituted alkyl group having 1 or more and 10 or less carbon atoms.

In the present disclosure, the toner contains a toner particle. The toner particle includes a core containing a binder resin and a shell covering the surface of the core. The shell contains at least one resin selected from the group consisting of: a melamine resin; and a resin having a structural unit represented by the formula (3).

Further, the electrophotographic photosensitive member includes a monolayer type photosensitive layer containing a charge generating substance, a hole transporting substance, an electron transporting substance, and a binder resin. The photosensitive layer contains, as the binder resin, a polyarylate resin having a structural unit represented by the formula (1) and a structural unit represented by the formula (2). It has been found that, with this configuration, a decrease in transfer efficiency after endurance is suppressed, and high image quality can be maintained from an initial stage to a stage after endurance.

The structural unit represented by the formula (1) exhibits a structure having a high electron accepting property. In addition, when the structural unit represented by the formula (1) is bonded to the structural unit represented by the formula (2), resonance is stabilized, and the electron accepting property becomes higher. It is conceived that the electrophotographic photosensitive member containing the polyarylate resin having the structural unit represented by the formula (1) and the structural unit represented by the formula (2) enhances the positive chargeability of the toner when the toner is developed and transferred. That is, it is assumed that, with the incorporation of the polyarylate resin having a high electron accepting property, the electrophotographic photosensitive member is relatively negatively charged and the positive chargeability of the toner is relatively increased, to thereby reduce transfer residual toner.

[Electrophotographic Photosensitive Member]

The electrophotographic photosensitive member of the present disclosure includes at least a support and a photosensitive layer formed on the support.

A method of producing the electrophotographic photosensitive member of the present disclosure is, for example, a method involving: preparing coating liquids for respective layers to be described later; applying the liquids in a desired order of the layers; and drying the liquids. In this case, examples of the method of applying the coating liquid include dip coating, spray coating, inkjet coating, roll coating, die coating, blade coating, curtain coating, wire bar coating, and ring coating. Of those, dip coating is preferred from the viewpoints of efficiency and productivity.

Details are described below.

(Monolayer Type Photosensitive Member)

Figure 2:
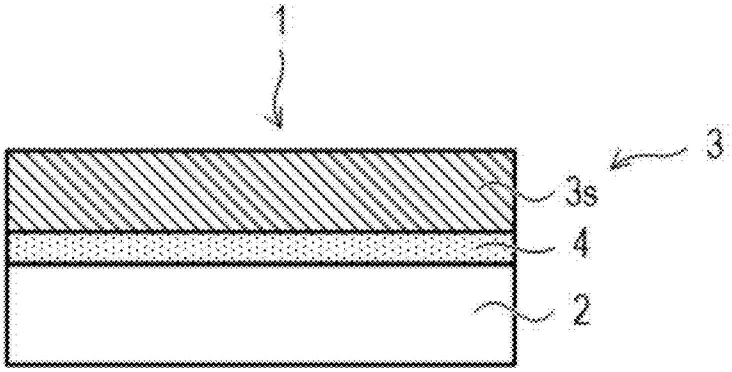
FIG. 2 is a view for illustrating an example of a layer configuration of the electrophotographic photosensitive member in the present disclosure.
Figure 3:
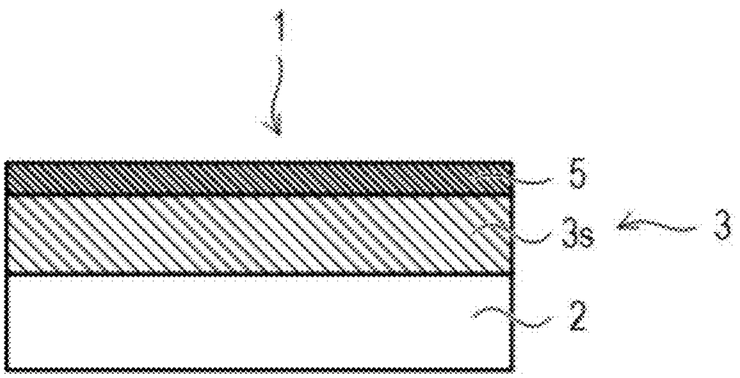
FIG. 3 is a view for illustrating an example of a layer configuration of the electrophotographic photosensitive member in the present disclosure.

A monolayer type photosensitive member that is an example of the photosensitive member of this embodiment is described with reference to FIG. 1 to FIG. 3. FIG. 1 to FIG. 3 are each a partial sectional view of a monolayer type photosensitive member. As illustrated in FIG. 1, a monolayer type photosensitive member 1 includes, for example, an electroconductive support 2 and a photosensitive layer 3. The photosensitive layer 3 included in the monolayer type photosensitive member 1 is a monolayer (one layer). The one-layer photosensitive layer 3 is a monolayer type photosensitive layer 3*s* that is a first photosensitive layer. As illustrated in FIG. 2, the monolayer type photosensitive member 1 may further include an undercoat layer 4 (intermediate layer) in addition to the electroconductive support 2 and the monolayer type photosensitive layer 3*s*. The undercoat layer 4 is formed between the electroconductive support 2 and the monolayer type photosensitive layer 3*s*. As illustrated in FIG. 1, the monolayer type photosensitive layer 3*s* may be formed directly on the electroconductive support 2. Alternatively, as illustrated in FIG. 2, the monolayer type photosensitive layer 3*s* may be formed on the electroconductive support 2 through intermediation of the undercoat layer 4. As illustrated in FIG. 3, the monolayer type photosensitive member 1 may further include a protection layer 5 in addition to the electroconductive support 2 and the monolayer type photosensitive layer 3*s*. The protection layer 5 is formed on the monolayer type photosensitive layer 3*s*. As illustrated in each of FIG. 1 and FIG. 2, the monolayer type photosensitive layer 3*s* is preferably formed as an outermost surface layer of the monolayer type photosensitive member 1. When the monolayer type photosensitive layer 3*s* containing a polyarylate resin (PAR) to be described later is formed as the outermost surface layer, a decrease in transfer efficiency after endurance is easily suppressed. As illustrated in FIG. 3, the protection layer 5 may be formed as the outermost surface layer of the monolayer type photosensitive member 1. The thickness of the monolayer type photosensitive layer 3s is not particularly limited, but is preferably 5 μm or more and 100 μm or less, more preferably 10 μm or more and 50 μm or less. The monolayer type photosensitive layer 3s that is the first photosensitive layer contains a charge generating substance, a binder resin, an electron transporting substance, and a hole transporting substance.

<Support>

In the present disclosure, the electrophotographic photosensitive member includes a support. In the present disclosure, the support is preferably an electroconductive support having electroconductivity. In addition, examples of the shape of the support include a cylindrical shape, a belt shape, and a sheet shape. A support having a cylindrical shape out of those shapes is preferred. In addition, the surface of the support may be subjected to, for example, electrochemical treatment such as anodization, blast treatment, or cutting treatment.

A metal, a resin, glass, or the like is preferred as a material for the support.

Examples of the metal include aluminum, iron, nickel, copper, gold, stainless steel, and alloys thereof. An aluminum support using aluminum out of those metals is preferred.

In addition, electroconductivity may be imparted to the resin or the glass through treatment involving, for example, mixing or coating the resin or the glass with an electroconductive material.

<Undercoat Layer>

In the present disclosure, an undercoat layer may be arranged on the support. The arrangement of the undercoat layer can improve an adhesive function between layers to impart a charge injection inhibiting function.

The undercoat layer preferably contains a resin. In addition, the undercoat layer may be formed as a cured film by polymerizing a composition containing a monomer having a polymerizable functional group.

Examples of the resin include a polyester resin, a polyarylate resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group of the monomer having the polymerizable functional group include an isocyanate group, a blocked isocyanate group, a methylol group, an alkylated methylol group, an epoxy group, a metal alkoxide group, a hydroxy group, an amino group, a carboxy group, a thiol group, a carboxylic acid anhydride group, and a carbon-carbon double bond group.

In addition, the undercoat layer may further contain an electron transporting substance, a metal oxide, a metal, an electroconductive polymer, and the like for the purpose of improving electric characteristics. Of those, an electron transporting substance and a metal oxide are preferably used.

Examples of the electron transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron transporting substance having a polymerizable functional group may be used as the electron transporting substance and copolymerized with the above-mentioned monomer having a polymerizable functional group to form the undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

In addition, the undercoat layer may further contain an additive.

The average thickness of the undercoat layer is preferably 0.1 μm or more and 50 μm or less, more preferably 0.2 μm or more and 40 μm or less, particularly preferably 0.3 μm or more and 30 μm or less.

The undercoat layer may be formed by: preparing a coating liquid for an undercoat layer containing the above-mentioned respective materials and a solvent; forming a coating film of the coating liquid; and drying and/or curing the coating film. Examples of the solvent to be used in the coating liquid include an alcohol-based solvent, a ketone-based solvent, an ether-based solvent, an ester-based solvent, and an aromatic hydrocarbon-based solvent.

<Monolayer Type Photosensitive Layer>

In the present disclosure, the monolayer type photosensitive layer is formed on the support, or the undercoat layer or the like formed on the support.

The monolayer type photosensitive layer in the present disclosure is formed so as to contain at least a binder resin, a charge generating substance, a hole transporting substance, and an electron transporting substance.

[Binder Resin]

The binder resin to be used in the photosensitive layer contains a polyarylate resin having a structural unit represented by the formula (1) and a structural unit represented by the formula (2).

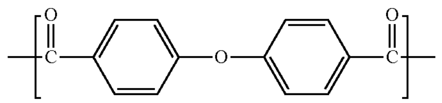

(1)

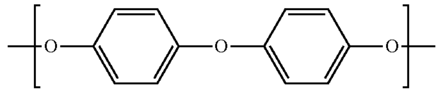

(2)

The structural unit represented by the formula (1) is a structure having a high electron accepting property. In addition, when the structural unit represented by the formula (1) is bonded to the structural unit represented by the formula (2), resonance is stabilized, and the electron accepting property becomes higher. It is conceived that the electrophotographic photosensitive member containing the polyarylate resin having the structural unit represented by the formula (1) and the structural unit represented by the formula (2) enhances the positive chargeability of toner when the positively charged toner is developed on the electrophotographic photosensitive member and transferred onto a transfer target member. It is assumed that, with this configuration, the electrophotographic photosensitive member is relatively negatively charged and the positive chargeability of the toner is relatively increased, to thereby reduce transfer residual toner.

The polyarylate resin may further have a structural unit represented by the following formula (4) and a structural unit represented by the following formula (5) in addition to the structural unit represented by the formula (1) and the structural unit represented by the formula (2).

(4)

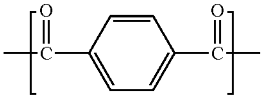

(5)

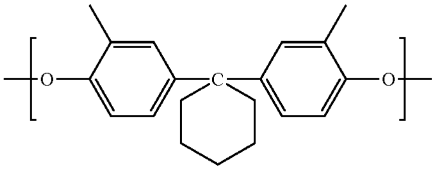

When the polyarylate resin has the structural unit represented by the formula (4) and the structural unit represented by the formula (5), the solubility of the polyarylate resin in a solvent is improved, and hence a photosensitive layer can be satisfactorily formed.

When the ratio of an amount of substance of the structural unit represented by the formula (1) to a total amount of substance of the structural unit represented by the formula (1) and the structural unit represented by the formula (4) in the polyarylate resin is represented by M1, the M1 is preferably more than 0.30, more preferably 0.50 or more from the viewpoint of suppressing a decrease in transfer efficiency.

When the ratio of an amount of substance of the structural unit represented by the formula (2) to a total amount of substance of the structural unit represented by the formula (2) and the structural unit represented by the formula (5) in the polyarylate resin is represented by M2, the M2 is preferably larger from the viewpoint of suppressing a decrease in transfer efficiency. Meanwhile, the M2 is preferably 0.50 or less from the viewpoint of solubility in a solvent. That is, the M2 preferably satisfies $0<M2\leq0.50$. When the solubility in a solvent is improved, a photosensitive layer can be satisfactorily formed.

When the ratio of an amount of substance of the structural unit represented by the formula (4) to the total amount of substance of the structural unit represented by the formula (1) and the structural unit represented by the formula (4) in the polyarylate resin is represented by M4, the M4 preferably satisfies $0.30\leq M4\leq0.70$ from the viewpoint of solubility in a solvent.

When the ratio of an amount of substance of the structural unit represented by the formula (5) to the total amount of substance of the structural unit represented by the formula (2) and the structural unit represented by the formula (5) in the polyarylate resin is represented by M5, the M5 is preferably 0.80 or less from the viewpoint of suppressing a decrease in transfer efficiency. In addition, the M5 is preferably 0.50 or more from the viewpoint of solubility in a solvent.

In the above-mentioned polyarylate resin, the sum of the ratio of the amount of substance of the structural unit represented by the formula (1) and the ratio of the amount of substance of the structural unit represented by the formula (4) is preferably 0.50 or more with respect to the sum of the amounts of substances of structural units derived from dicarboxylic acids for forming the polyarylate resin.

In the above-mentioned polyarylate resin, the sum of the ratio of the amount of substance of the structural unit represented by the formula (2) and the ratio of the amount of substance of the structural unit represented by the formula (5) is preferably 0.50 or more with respect to the sum of the amounts of substances of structural units derived from bisphenols for forming the polyarylate resin.

In addition, the ratio of the amount of substance of the structural unit represented by the formula (1) is more preferably 0.50 or more with respect to the sum of the amount of substance of the structural unit derived from a dicarboxylic acid for forming the above-mentioned polyarylate resin.

The photosensitive layer may contain a resin other than the above-mentioned polyarylate resin to the extent that the effects of the present disclosure are not impaired. Examples of the other resin include a polycarbonate resin, a styrene resin, and an acrylic resin. The polyarylate resin may be, for example, a random copolymer, an alternating copolymer, a periodic copolymer, or a block copolymer.

The viscosity-average molecular weight of the polyarylate resin (PAR) is preferably 10,000 or more, more preferably 30,000 or more, still more preferably 50,000 or more. When the viscosity-average molecular weight of the polyarylate resin (PAR) is 10,000 or more, the wear resistance of the photosensitive member is improved. Meanwhile, the viscosity-average molecular weight of the polyarylate resin (PAR) is preferably 80,000 or less, more preferably 70,000 or less. When the viscosity-average molecular weight of the polyarylate resin (PAR) is 80,000 or less, the polyarylate resin (PAR) is easily dissolved in a solvent for forming a photosensitive layer.

In the present disclosure, the polyarylate resin is formed so as to have the structural unit represented by the formula (2) as a bisphenol-derived repeating unit and the structural unit represented by the formula (1) as a dicarboxylic acid-derived repeating unit. In addition, in the present disclosure, it is preferred that the polyarylate resin be formed so as to further have the structural unit represented by the formula (5) as the bisphenol-derived repeating unit and the structural unit represented by the formula (4) as the dicarboxylic acid-derived repeating unit. Examples of the bisphenol for forming the bisphenol-derived repeating unit include a compound represented by the formula (BP-2) and a compound represented by the formula (BP-5) (hereinafter sometimes referred to as "compound (BP-2)" and "compound (BP-5)", respectively). Examples of the dicarboxylic acid for forming the dicarboxylic acid-derived repeating unit include a compound represented by the formula (DC-1) and a compound represented by the formula (DC-4) (hereinafter sometimes referred to as "compound (DC-1)" and "compound (DC-4)", respectively). A bisphenol ratio in the resin (that is, the content ratios of the structural unit represented by the formula (2) and the structural unit represented by the formula (5)) may be adjusted by changing the amounts of the compound (BP-2) and the compound (BP-5) to be added at the time of production of the polyarylate resin (PAR). In addition, the amount of the dicarboxylic acids, that is, a dicarboxylic acid ratio in the resin (that is, the content ratios of the structural unit represented by the formula (1) and the structural unit represented by the formula (4)) may be similarly adjusted by changing the amounts of the compound (DC-1) and the compound (DC-4) to be added at the time of production.

(BP-2)

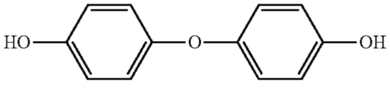

-continued (BP-5)

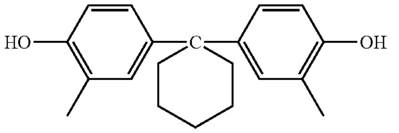

(DC-1)

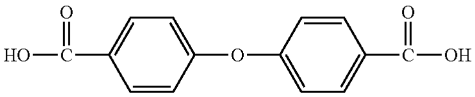

(DC-4)

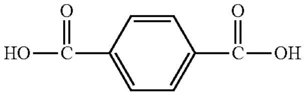

The bisphenols (e.g., the compound (BP-2) and the compound (BP-5)) may each be used by being derivatized into an aromatic diacetate. The dicarboxylic acids (e.g., the compound (DC-1) and the compound (DC-4)) may each be used by being derivatized. Examples of the derivative of the dicarboxylic acid include a dicarboxylic acid dichloride, a dicarboxylic acid dimethyl ester, a dicarboxylic acid diethyl ester, and a dicarboxylic acid anhydride. The dicarboxylic acid dichloride is a compound obtained by substituting each of two "—C(═O)—OH" groups of the dicarboxylic acid with a "—C(═O)—Cl" group.

In the polycondensation of the bisphenol and the dicarboxylic acid, one or both of a base and a catalyst may be added. An example of the base is sodium hydroxide. Examples of the catalyst include benzyltributylammonium chloride, ammonium chloride, ammonium bromide, a quaternary ammonium salt, triethylamine, and trimethylamine.

The photosensitive layer may contain, as the binder resin, only the polyarylate resin (PAR) having the structural unit represented by the formula (1) and the structural unit represented by the formula (2), and may further contain a binder resin other than the foregoing (hereinafter sometimes referred to as "other binder resin" in the photosensitive layer). Examples of the other binder resin in the photosensitive layer include: thermoplastic resins (more specifically, a polyarylate resin other than the polyarylate resin (PAR) in the present disclosure, a polycarbonate resin, a styrene-based resin, a styrene-butadiene copolymer, a styrene-acrylonitrile copolymer, a styrene-maleic acid copolymer, a styrene-acrylic acid copolymer, an acrylic copolymer, a polyethylene resin, an ethylene-vinyl acetate copolymer, a chlorinated polyethylene resin, a polyvinyl chloride resin, a polypropylene resin, an ionomer, a vinyl chloride-vinyl acetate copolymer, a polyester resin, an alkyd resin, a polyamide resin, a polyurethane resin, a polysulfone resin, a diallyl phthalate resin, a ketone resin, a polyvinyl butyral resin, a polyvinyl acetal resin, and a polyether resin); thermosetting resins (more specifically, a silicone resin, an epoxy resin, a phenol resin, a urea resin, a melamine resin, and any other crosslinkable thermosetting resin); and photocurable resins (more specifically, an epoxy-acrylic acid-based resin, and a urethane-acrylic acid-based copolymer). The binder resin in the photosensitive layer preferably contains 50 mass % or more of the polyarylate resin having the structural unit represented by the formula (1), and the structural unit represented by formula (2).

The structure of the polyarylate resin of the present disclosure may be determined by a $^1$H-nuclear magnetic resonance spectrum obtained by performing component analysis of polymer components recovered from the photosensitive layer through use of $^1$H-nuclear magnetic resonance spectrometry (proton NMR) in deuterated chloroform.

A specific analysis method for the polyarylate resin in the photosensitive layer when the photosensitive member is a cylindrical body is described below.

(Reprecipitation of Resin in Photosensitive Layer)

The photosensitive member is cut at a position 10 cm distant from an end portion of the photosensitive member in a generating line direction with a scroll saw.

An inner surface of the cut cylindrical body of 10 cm is wiped with lens-cleaning paper impregnated with chloroform.

To elute the photosensitive layer, 3 cm of an end portion of the cut cylindrical body is immersed in chloroform. (About 60 ml of chloroform is loaded into a 100 mL beaker, and the end portion is immersed therein at normal temperature for 5 minutes.)

The chloroform solution in which the above-mentioned photosensitive layer has been eluted is concentrated to 2 mL with a rotary evaporator to provide a concentrated solution, and the concentration is stopped.

50 mL of a methanol/acetone mixed solution (volume ratio: 1:1) is prepared, and the whole amount of the above-mentioned concentrated solution is dropped thereinto while the mixed solution is stirred, to thereby perform reprecipitation.

Suction filtration is performed with a funnel (funnel: SU-40, paper filter: No. 5C-40, manufactured by Kiriyama Glass Co.).

The residue on the paper filter is recovered with a spatula and dried in a vacuum (70° C., 1 hour).

(NMR Measurement)

To prepare a measurement sample, 20 mg of a sample is dissolved in 1 g of deuterated chloroform containing tetramethylsilane serving as a reference material, and the whole amount thereof is transferred to an NMR tube.

(Deuterated chloroform: manufactured by Sigma-Aldrich Japan G.K., chloroform-d, model number: 612200)

(NMR tube: manufactured by Norell, Inc., ST500-7, model number: S3010)

NMR measurement

Apparatus: AVANCE 500 manufactured by Bruker

Conditions: Proton NMR, automatic measurement by Icon-NMR

Number of scans: 32

Reference peak: The peak of a methyl group of tetramethylsilane is set as 0 ppm.

[Charge Generating Substance]

Examples of the charge generating substance include a phthalocyanine-based pigment, a perylene-based pigment, a bisazo pigment, a trisazo pigment, a dithioketopyrrolopyrrole pigment, a metal-free naphthalocyanine pigment, a metal naphthalocyanine pigment, a squaraine pigment, an indigo pigment, an azulenium pigment, a cyanine pigment, powder of an inorganic photoconductive material (e.g., selenium, selenium-tellurium, selenium-arsenic, cadmium sulfide, and amorphous silicon), a pyrylium pigment, an anthanthrone-based pigment, a triphenylmethane-based pigment, a threne-based pigment, a toluidine-based pigment, a pyrazoline-based pigment, and a quinacridone-based pigment. The photosensitive layer may contain only one kind of charge generating substance, or may contain two or more kinds of charge generating substances.

The phthalocyanine-based pigment is a pigment having a phthalocyanine structure. Examples of the phthalocyanine-based pigment include metal-free phthalocyanine and a metal phthalocyanine. Examples of the metal phthalocyanine include titanyl phthalocyanine, hydroxygallium phthalocyanine, and chlorogallium phthalocyanine. The metal phthalocyanine is preferably titanyl phthalocyanine. Titanyl phthalocyanine is a compound represented by the following formula (CGM-1).

(CGM-1)

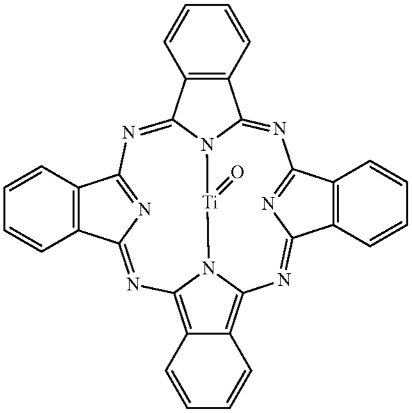

The phthalocyanine-based pigment may be crystalline or amorphous. An example of the crystal of metal-free phthalocyanine is an X-form crystal of metal-free phthalocyanine (hereinafter sometimes referred to as "X-form metal-free phthalocyanine"). Examples of the crystal of titanyl phthalocyanine include an α-form crystal, a β-form crystal, and a Y-form crystal of titanyl phthalocyanine (hereinafter sometimes referred to as "α-form titanyl phthalocyanine," "β-form titanyl phthalocyanine," and "Y-form titanyl phthalocyanine," respectively). For example, in a digital optical electrophotographic apparatus (e.g., a laser beam printer or a facsimile using a light source such as a semiconductor laser), a photosensitive member having sensitivity in a wavelength region of 700 nm or more is preferably used. The charge generating substance is preferably a phthalocyanine-based pigment, more preferably metal-free phthalocyanine or titanyl phthalocyanine, still more preferably titanyl phthalocyanine because these materials each have a high quantum yield in a wavelength region of 700 nm or more. Of those, Y-form titanyl phthalocyanine is particularly preferred.

The Y-form titanyl phthalocyanine has a main peak, for example, at a Bragg angle (2θ±0.2°) of 27.2° in a CuKα characteristic X-ray diffraction spectrum. The main peak in the CuKα characteristic X-ray diffraction spectrum is a peak having the first or second largest intensity in the range of a Bragg angle (2θ±0.2°) of 3° or more and 40° or less. The Y-form titanyl phthalocyanine does not have a peak at 26.2° in the CuKα characteristic X-ray diffraction spectrum.

The CuKα characteristic X-ray diffraction spectrum may be measured, for example, by the following method. First, a sample is loaded into a sample holder of an X-ray diffraction apparatus (e.g., "RINT (trademark) 1100" manufactured by Rigaku Corporation), and an X-ray diffraction spectrum is measured under the conditions of an X-ray tube bulb of Cu, a tube voltage of 40 kV, a tube current of 30 mA, and a CuKα characteristic X-ray wavelength of 1.542 Å. A measurement range (2θ) is, for example, 3° or more and 40° or less (start angle: 3° and stop angle: 40°), and a scanning speed is, for example, 10°/min. The main peak is determined from the resultant X-ray diffraction spectrum, and the Bragg angle of the main peak is read.

The content of the charge generating substance is preferably 0.1 part by mass or more and 50 parts by mass or less, more preferably 0.5 part by mass or more and 5 parts by mass or less with respect to 100 parts by mass of the binder resin.

[Electron Transporting Substance]

The electron transporting substance may contain at least one compound selected from the group consisting of: a compound represented by the following formula (10); a compound represented by the following formula (11); a compound represented by the following formula (12); a compound represented by the following formula (13); a compound represented by the following formula (14); a compound represented by the following formula (15); and a compound represented by the following formula (16). It is conceived that the incorporation of the above-mentioned electron transporting substance into the photosensitive layer increases the compatibility between the binder resin and a hole transporting substance to be described later in the present disclosure to increase the homogeneity of the inside of the photosensitive layer, to thereby enhance the effects of the present disclosure.

(10)

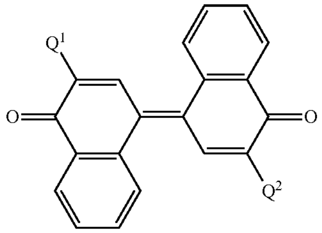

(11)

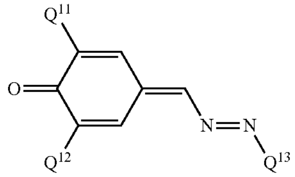

(12)

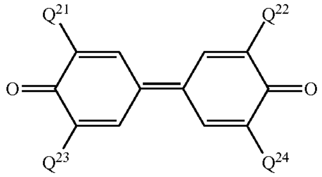

(13)

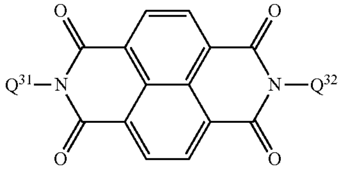

(14)

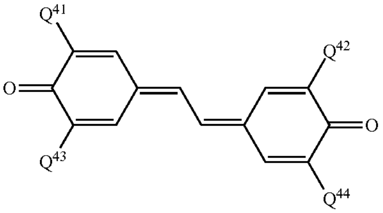

-continued (15)

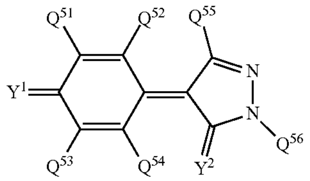

(16)

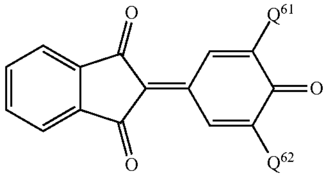

$Q^1$ and $Q^2$ in the formula (10), $Q^{11}$, $Q^{12}$, and $Q^{13}$ in the formula (11), $Q^{21}$, $Q^{22}$, $Q^{23}$, and $Q^{24}$ in the formula (12), $Q^{31}$ and $Q^{32}$ in the formula (13), $Q^{41}$, $Q^{42}$, $Q^{43}$, and $Q^{44}$ in the formula (14), $Q^{51}$, $Q^{52}$, $Q^{53}$, $Q^{54}$, $Q^{55}$, and $Q^{56}$ in the formula (15), and $Q^{61}$ and $Q^{62}$ in the formula (16) each independently represent a hydrogen atom, a halogen atom, a cyano group, an alkyl group having 1 or more and 6 or less carbon atoms, an alkenyl group having 2 or more and 6 or less carbon atoms, an alkoxy group having 1 or more and 6 or less carbon atoms, or an aryl group having 6 or more and 14 or less carbon atoms that may be substituted with at least one substituent selected from the group consisting of: an alkyl group having 1 or more and 6 or less carbon atoms; and a halogen atom. $Y^1$ and $Y^2$ in the formula (15) each independently represent an oxygen atom or a sulfur atom.

It is preferred that $Q^1$ and $Q^2$ in the formula (10), $Q^{11}$ to $Q^{13}$ in the formula (11), $Q^{21}$ to $Q^{24}$ in the formula (12), $Q^{31}$ and $Q^{32}$ in the formula (13), $Q^{41}$ to $Q^{44}$ in the formula (14), $Q^{51}$ to $Q^{56}$ in the formula (15), and $Q^{61}$ and $Q^{62}$ in the formula (16) each independently represent a hydrogen atom, an alkyl group having 1 or more and 6 or less carbon atoms, or an aryl group having 6 or more and 14 or less carbon atoms that may be substituted with at least one substituent selected from the group consisting of: an alkyl group having 1 or more and 6 or less carbon atoms; and a halogen atom. It is preferred that $Y^1$ and $Y^2$ in the formula (15) each represent an oxygen atom.

When $Q^1$ and $Q^2$ in the formula (10), $Q^{11}$ to $Q^{13}$ in the formula (11), $Q^{21}$ to $Q^{24}$ in the formula (12), $Q^{31}$ and $Q^{32}$ in the formula (13), $Q^{41}$ to $Q^{44}$ in the formula (14), $Q^{51}$ to $Q^{56}$ in the formula (15), and $Q^{61}$ and $Q^{62}$ in the formula (16) each represent an alkyl group having 1 or more and 6 or less carbon atoms, these groups each represent preferably an alkyl group having 1 or more and 5 or less carbon atoms, preferably a methyl group, an ethyl group, a propyl group, a butyl group, or a pentyl group, particularly preferably a methyl group, an isopropyl group, a tert-butyl group, or a 1,1-dimethylpropyl group.

When $Q^1$ and $Q^2$ in the formula (10), $Q^{11}$ to $Q^{13}$ in the formula (11), $Q^{21}$ to $Q^{24}$ in the formula (12), $Q^{31}$ and $Q^{32}$ in the formula (13), $Q^{41}$ to $Q^{44}$ in the formula (14), $Q^{51}$ to $Q^{56}$ in the formula (15), and $Q^{61}$ and $Q^{62}$ in the formula (16) each represent an aryl group having 6 or more and 14 or less carbon atoms, these groups each represent preferably an aryl group having 6 or more and 10 or less carbon atoms, more preferably a phenyl group. The aryl group having 6 or more and 14 or less carbon atoms may be substituted with at least one substituent selected from the group consisting of: an alkyl group having 1 or more and 6 or less carbon atoms; and a halogen atom. The alkyl group having 1 or more and 6 or less carbon atoms, which is a substituent, is preferably an alkyl group having 1 or more and 3 or less carbon atoms, more preferably a methyl group or an ethyl group. The halogen atom, which is a substituent, is preferably a fluorine atom, a chlorine atom, or a bromine atom, particularly preferably a chlorine atom. When the aryl group having 6 or more and 14 or less carbon atoms is substituted with a substituent, the number of substituents is preferably 1 or more and 5 or less, more preferably 1 or 2. The aryl group having 6 or more and 14 or less carbon atoms that is substituted with at least one substituent selected from the group consisting of: an alkyl group having 1 or more and 6 or less carbon atoms; and a halogen atom is preferably a chlorophenyl group, a dichlorophenyl group, or an ethylmethylphenyl group, more preferably a 4-chlorophenyl group, a 2,5-dichlorophenyl group, or a 2-ethyl-6-methylphenyl group.

A suitable example of the compound represented by the formula (10) is a compound represented by the formula (E-4). A suitable example of the compound represented by the formula (11) is a compound represented by the formula (E-5). A suitable example of the compound represented by the formula (12) is a compound represented by the formula (E-7). A suitable example of the compound represented by the formula (13) is a compound represented by the formula (E-6). A suitable example of the compound represented by the formula (14) is a compound represented by the formula (E-8). Suitable examples of the compound represented by the formula (15) include a compound represented by the formula (E-2) and a compound represented by the formula (E-3). A suitable example of the compound represented by the formula (16) is a compound represented by the formula (E-1). The compounds represented by the formulae (E-1) to (E-8) are sometimes referred to as "electron transporting substances (E-1) to (E-8)," respectively.

(E-1)

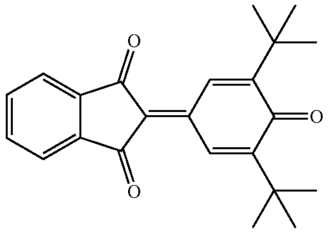

(E-2)

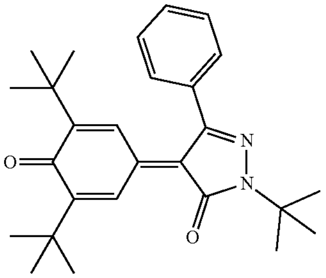

-continued (E-3)

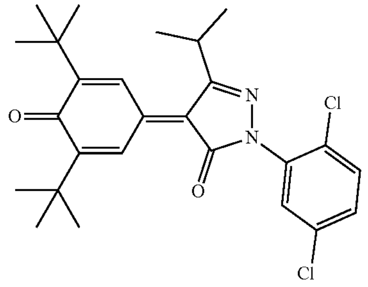

(E-4)

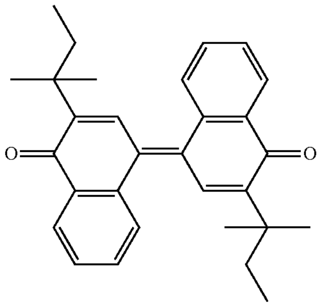

(E-5)

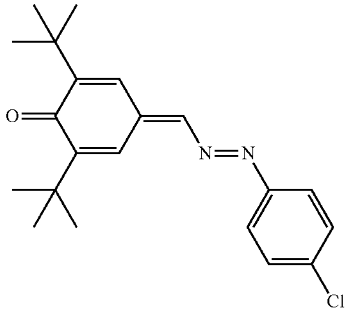

(E-6)

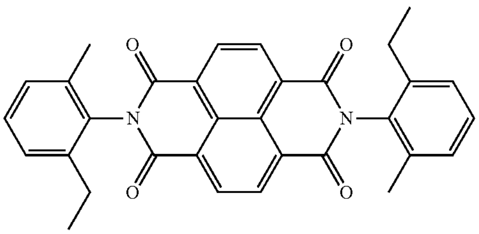

-continued (E-7)

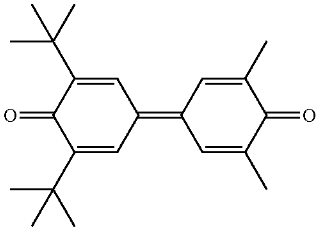

(E-8)

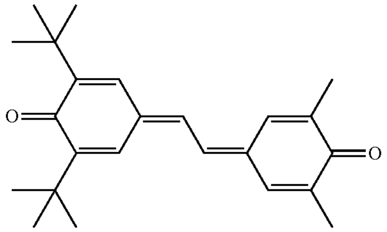

The content of the electron transporting substance is preferably 5 parts by mass or more and 150 parts by mass or less, more preferably 10 parts by mass or more and 100 parts by mass or less, still more preferably 30 parts by mass or more and 70 parts by mass or less with respect to 100 parts by mass of the binder resin. The photosensitive layer may contain only one kind of electron transporting substance, or may contain two or more kinds of electron transporting substances.

[Hole Transporting Substance]

At least one compound selected from the group consisting of: a compound represented by the following formula (20); a compound represented by the following formula (21); a compound represented by the following formula (22); a compound represented by the following formula (23); and a compound represented by the following formula (24) is preferably used as the hole transporting substance. It is conceived that the incorporation of the above-mentioned hole transporting substance into the photosensitive layer increases the compatibility between the binder resin and the electron transporting substance in the present disclosure to increase the homogeneity of the inside of the photosensitive layer, to thereby enhance the effects of the present disclosure.

(20)

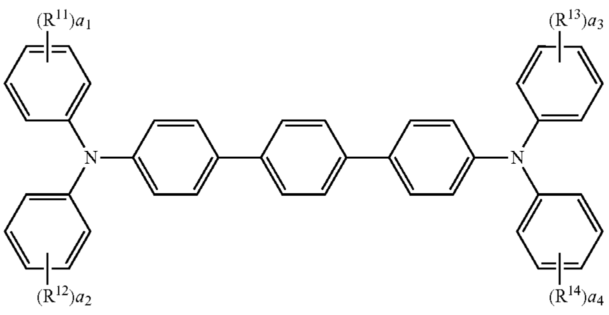

-continued
(21)
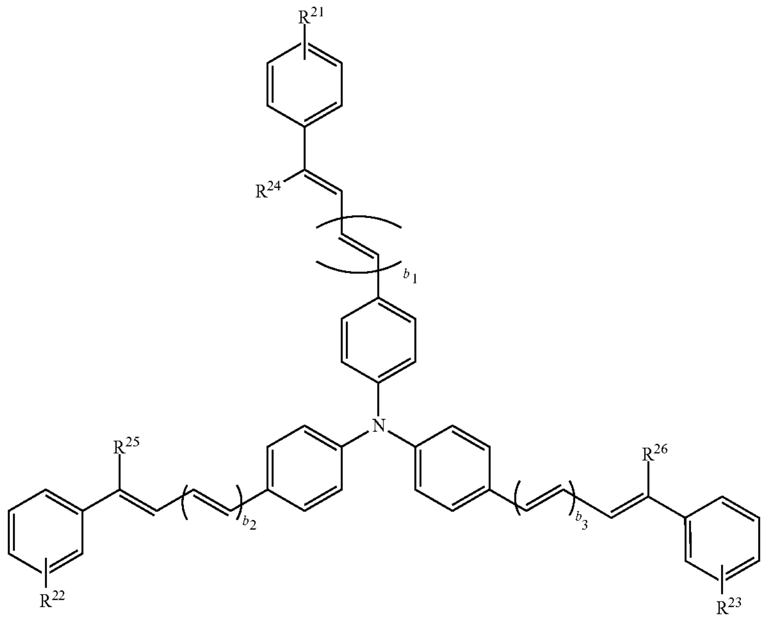
(22)
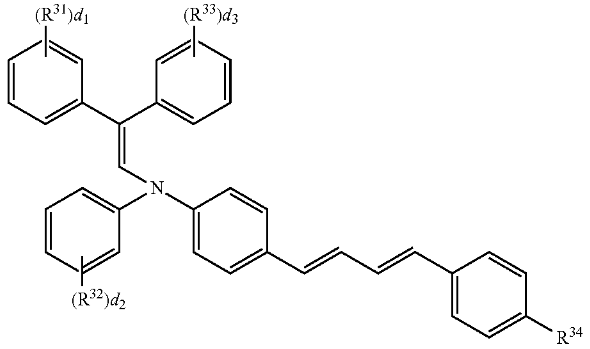
(23)
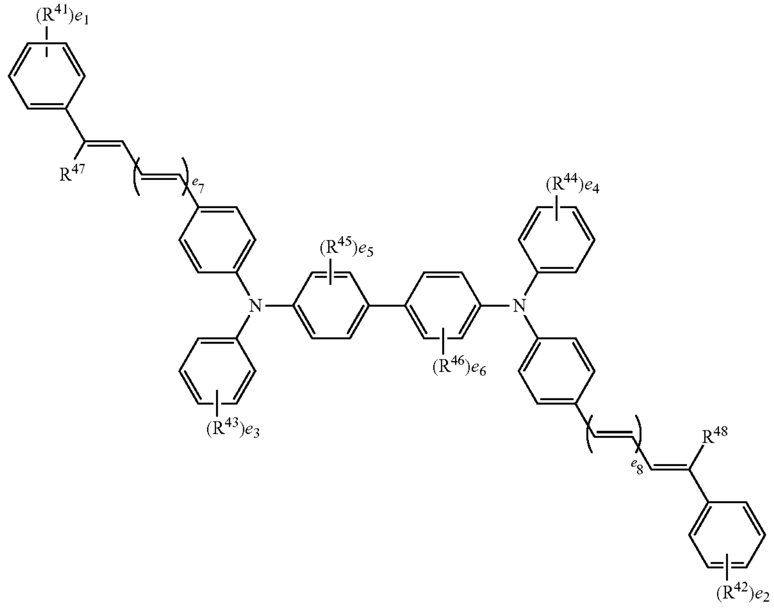

-continued (24)

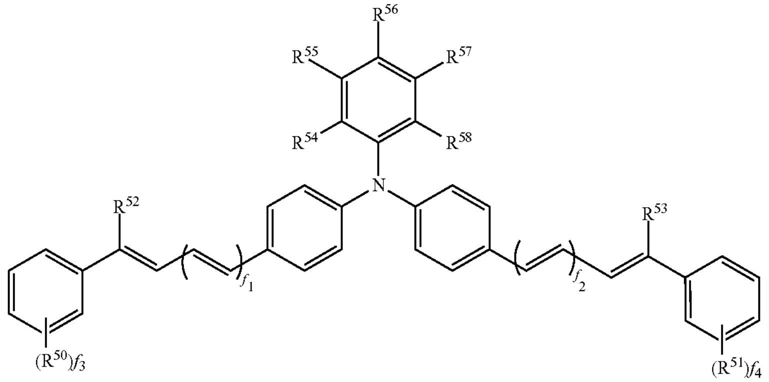

In the formula (20), $R^{11}$, $R^{12}$, $R^{13}$, and $R^{14}$ each independently represent an alkyl group having 1 or more and 6 or less carbon atoms, or an alkoxy group having 1 or more and 6 or less carbon atoms, and $a_1$, $a_2$, $a_3$, and $a_4$ each independently represent an integer of 0 or more and 5 or less. In the formula (20), when $a_1$ represents an integer of 2 or more and 5 or less, a plurality of $R^{11}$s may represent groups identical to or different from each other. When $a_2$ represents an integer of 2 or more and 5 or less, a plurality of $R^{12}$s may represent groups identical to or different from each other. When $a_3$ represents an integer of 2 or more and 5 or less, a plurality of $R^{13}$s may represent groups identical to or different from each other. When $a_4$ represents an integer of 2 or more and 5 or less, a plurality of $R^{14}$s may represent groups identical to or different from each other. In the formula (20), $R^{11}$, $R^{12}$, $R^{13}$, and $R^{14}$ each independently represent preferably an alkyl group having 1 or more and 3 or less carbon atoms, more preferably a methyl group or an ethyl group. $a_1$, $a_2$, $a_3$, and $a_4$ each independently represent preferably an integer of 1 or more and 3 or less, more preferably 1.

In the formula (21), $R^{21}$, $R^{22}$, and $R^{23}$ each independently represent an alkyl group having 1 or more and 6 or less carbon atoms, $R^{24}$, $R^{25}$, and $R^{26}$ each independently represent a hydrogen atom, or an alkyl group having 1 or more and 6 or less carbon atoms, and $b_1$, $b_2$, and $b_3$ each independently represent 0 or 1. In the formula (21), $R^{21}$, $R^{22}$, and $R^{23}$ each independently represent preferably an alkyl group having 1 or more and 3 or less carbon atoms, more preferably a methyl group. The bonding position of each of $R^{21}$, $R^{22}$, and $R^{23}$ in a phenyl group is preferably a meta-position with respect to the bonding position of the phenyl group to a triphenylamine structure. $R^{24}$, $R^{25}$, and $R^{26}$ each preferably represent a hydrogen atom. It is preferred that $b_1$, $b_2$, and $b_3$ all represent 0 or all represent 1.

In the formula (22), $R^{31}$, $R^{32}$, and $R^{33}$ each independently represent an alkyl group having 1 or more and 6 or less carbon atoms, $R^{34}$ represents an alkyl group having 1 or more and 6 or less carbon atoms, or a hydrogen atom, and $d_1$, $d_2$, and $d_3$ each independently represent an integer of 0 or more and 5 or less. In the formula (22), when $d_1$ represents an integer of 2 or more and 5 or less, a plurality of $R^{31}$s may represent groups identical to or different from each other. When $d_2$ represents an integer of 2 or more and 5 or less, a plurality of $R^{32}$s may represent groups identical to or different from each other. When $d_3$ represents an integer of 2 or more and 5 or less, a plurality of $R^{33}$s may represent groups identical to or different from each other. In the formula (22), $R^{34}$ preferably represents a hydrogen atom. $d_1$, $d_2$, and $d_3$ each preferably represent 0.

In the formula (23), $R^{41}$, $R^{42}$, $R^{43}$, $R^{44}$, $R^{45}$, and $R^{46}$ each independently represent an alkyl group having 1 or more and 6 or less carbon atoms, or a phenyl group, $R^{47}$ and $R^{48}$ each independently represent a hydrogen atom, an alkyl group having 1 or more and 6 or less carbon atoms, or a phenyl group, $e_1$, $e_2$, $e_3$, and $e_4$ each independently represent an integer of 0 or more and 5 or less, $e_5$ and $e_6$ each independently represent an integer of 0 or more and 4 or less, and $e_7$ and $e_8$ each independently represent 0 or 1. In the formula (23), when $e_1$ represents an integer of 2 or more and 5 or less, a plurality of $R^{41}$s may represent groups identical to or different from each other. When $e_2$ represents an integer of 2 or more and 5 or less, a plurality of $R^{42}$s may represent groups identical to or different from each other. When $e_3$ represents an integer of 2 or more and 5 or less, a plurality of $R^{43}$s may represent groups identical to or different from each other. When $e_4$ represents an integer of 2 or more and 5 or less, a plurality of $R^{44}$s may represent groups identical to or different from each other. When $e_5$ represents an integer of 2 or more and 4 or less, a plurality of $R^{45}$s may represent groups identical to or different from each other. When $e_6$ represents an integer of 2 or more and 4 or less, a plurality of $R^{46}$s may represent groups identical to or different from each other. In the formula (23), $R^{41}$ to $R^{46}$ each independently represent preferably an alkyl group having 1 or more and 6 or less carbon atoms, more preferably an alkyl group having 1 or more and 3 or less carbon atoms, still more preferably a methyl group or an ethyl group. $R^{47}$ and $R^{48}$ each preferably represent a hydrogen atom. It is preferred that $e_1$, $e_2$, $e_3$, and $e_4$ each independently represent an integer of 0 or more and 2 or less. It is more preferred that $e_1$ and $e_2$ each represent 0, and $e_3$ and $e_4$ each represent 2. $e_5$ and $e_6$ each preferably represent 0. It is preferred that $e_7$ and $e_8$ all represent 0 or all represent 1.

In the formula (24), $R^{50}$ and $R^{51}$ each independently represent an alkyl group having 1 or more and 6 or less carbon atoms, an alkoxy group having 1 or more and 6 or less carbon atoms, or a phenyl group, $R^{52}$, $R^{53}$, $R^{54}$, $R^{55}$, $R^{56}$, $R^{57}$, and $R^{5'}$ each independently represent a hydrogen atom, an alkyl group having 1 or more and 6 or less carbon atoms, an alkoxy group having 1 or more and 6 or less carbon atoms, or a phenyl group that may be substituted with an alkyl group having 1 or more and 6 or less carbon atoms, $f_1$ and $f_2$ each independently represent an integer of 0 or more and 2 or less, and $f_3$ and $f_4$ each independently represent an integer of 0 or more and 5 or less. In the formula (24), when $f_3$ represents an integer of 2 or more and 5 or less, a plurality of $R^{50}$s may represent groups identical to or different from each other. When $f_4$ represents an integer of 2 or more and 5 or less, a plurality of $R^{51}$s may represent groups identical to or different from each other. In the formula (24), it is preferred that $R^{50}$ and $R^{51}$ each independently represent an alkyl group having 1 or more and 6 or less carbon atoms. It is preferred that $R_{52}$ and $R_{53}$ each represent a hydrogen atom, or a phenyl group that may be substituted with an alkyl group having 1 or more and 6 or less carbon atoms. It is preferred that $R^{54}$ to $R^{5'}$ each independently represent a hydrogen atom, an alkyl group having 1 or more and 6 or less carbon atoms, or an alkoxy group having 1 or more and 6 or less carbon atoms. It is preferred that $f_1$ and $f_2$ all represent 0, all represent 1, or all represent 2. It is preferred that $f_3$ and $f_4$ each independently represent 0 or 1. When $R^{50}$ and $R^{51}$ each represent an alkyl group having 1 or more and 6 or less carbon atoms, these groups each represent preferably an alkyl group having 1 or more and 3 or less carbon atoms, more preferably a methyl group. When $R^{52}$ and $R^{53}$ each represent a phenyl group that may be substituted with an alkyl group having 1 or more and 6 or less carbon atoms, these groups each preferably represent a phenyl group, or a phenyl group that is substituted with an alkyl group having 1 or more and 3 or less carbon atoms. The phenyl group that is substituted with an alkyl group having 1 or more and 3 or less carbon atoms is preferably a methylphenyl group, more preferably a 4-methylphenyl group. When $R^{54}$ to $R^{58}$ each represent an alkyl group having 1 or more and 6 or less carbon atoms, these groups each represent preferably an alkyl group having 1 or more and 4 or less carbon atoms, more preferably a methyl group, an ethyl group, or a n-butyl group. When $R^{54}$ to $R^{58}$ each represent an alkoxy group having 1 or more and 6 or less carbon atoms, these groups each represent preferably an alkoxy group having 1 or more and 3 or less carbon atoms, more preferably an ethoxy group.

A suitable example of the compound represented by the formula (20) is a compound represented by the formula (H-11). Suitable examples of the compound represented by the formula (21) include a compound represented by the formula (H-7) and a compound represented by the formula (H-8). A suitable example of the compound represented by the formula (22) is a compound represented by the formula (H-6). Suitable examples of the compound represented by the formula (23) include a compound represented by the formula (H-9) and a compound represented by the formula (H-10). Suitable examples of the compound represented by the formula (24) include a compound represented by the formula (H-1), a compound represented by the formula (H-2), a compound represented by the formula (H-3), a compound represented by the formula (H-4), and a compound represented by the formula (H-5). The compounds represented by the formulae (H-1) to (H-11) are hereinafter sometimes referred to as "hole transporting substances (H-1) to (H-11)," respectively.

(H-1)

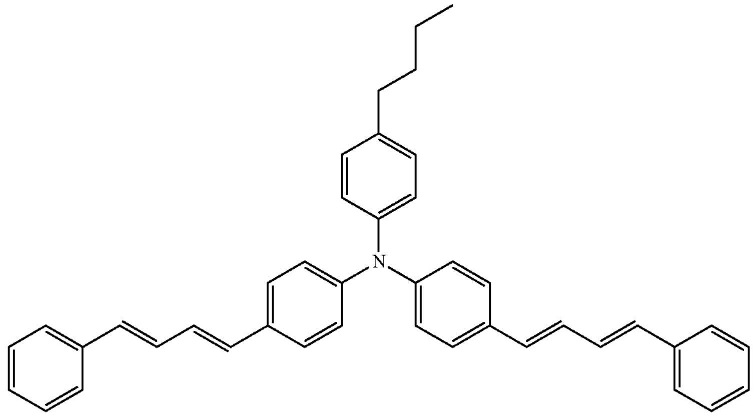

(H-2)

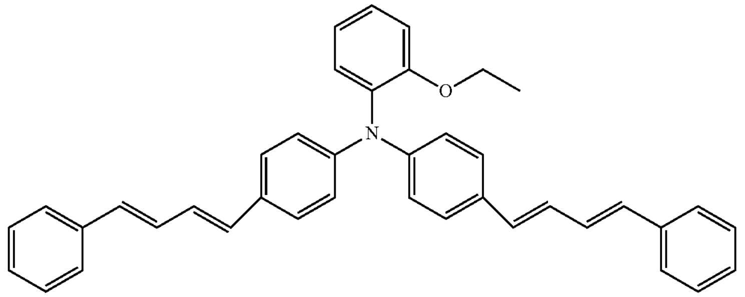

-continued
(H-3)
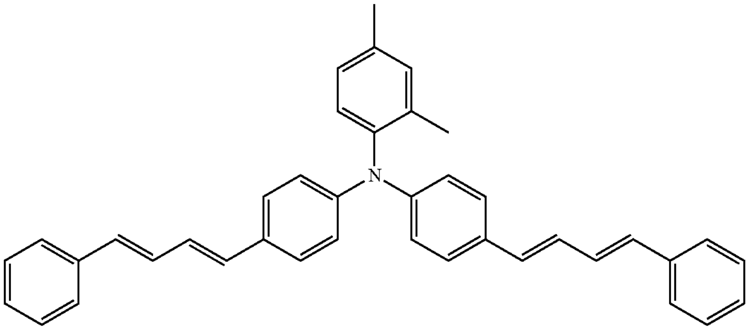
(H-4)
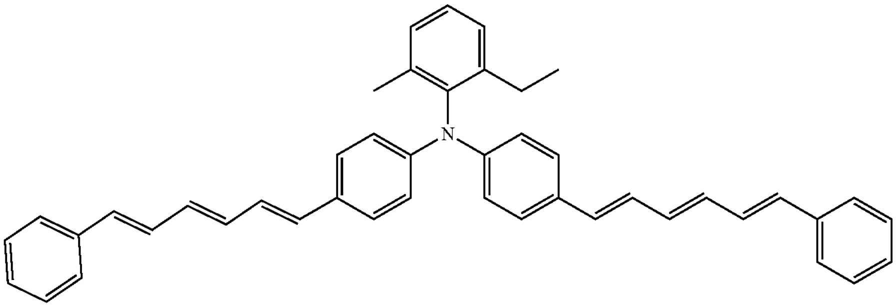
(H-5)
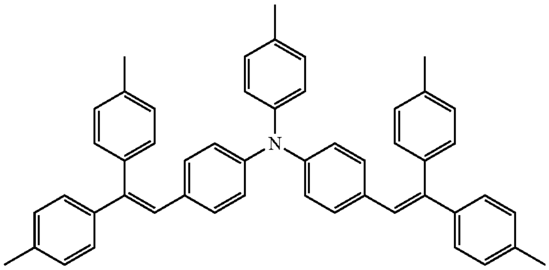
(H-6)
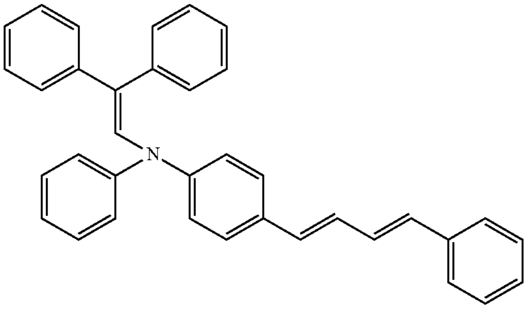
(H-7)
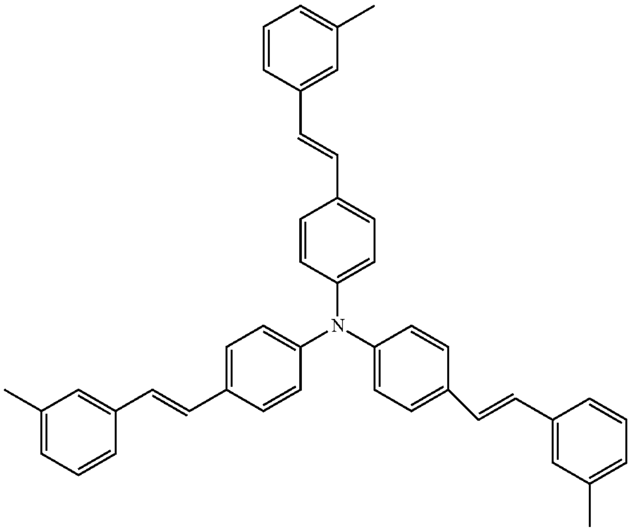

-continued
(H-8)
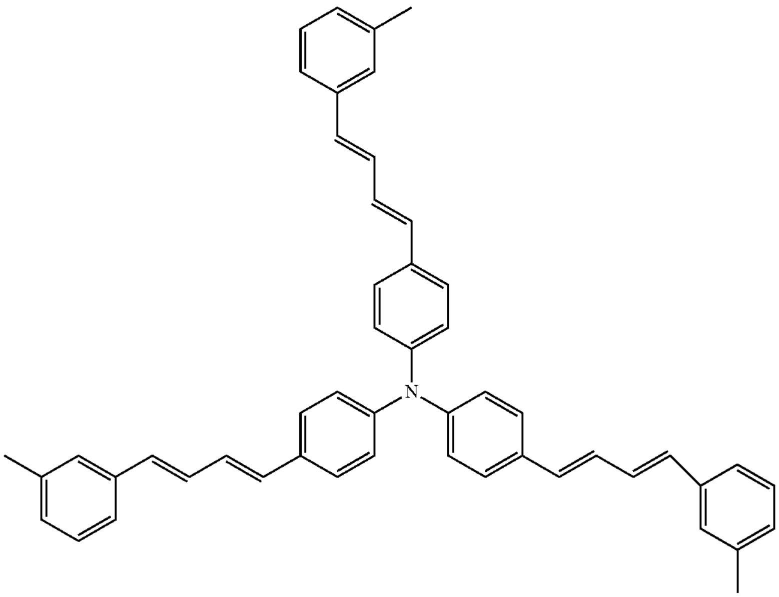
(H-9)
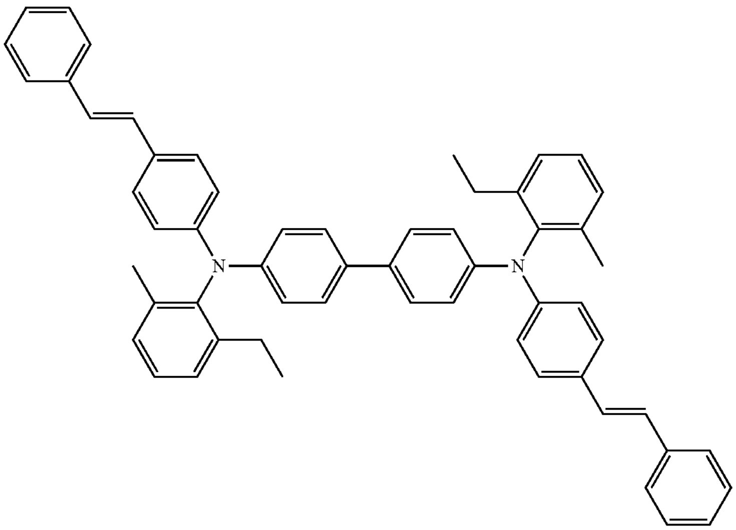

-continued (H-10)

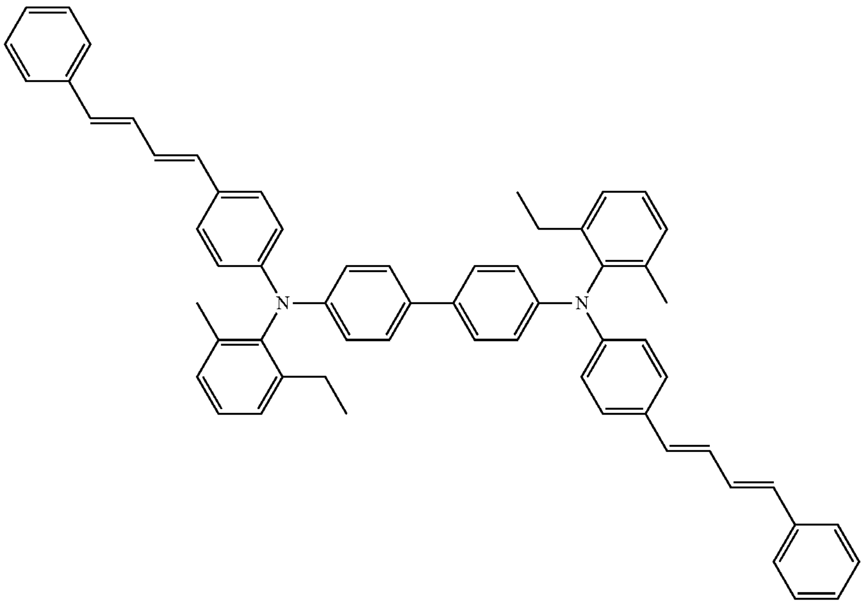

(H-11)

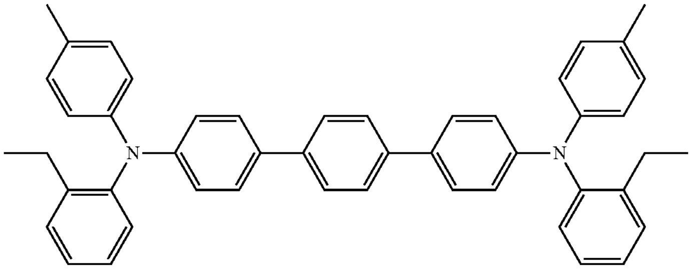

The content of the hole transporting substance is preferably 10 parts by mass or more and 200 parts by mass or less, more preferably 30 parts by mass or more and 120 parts by mass or less, still more preferably 50 parts by mass or more and 90 parts by mass or less with respect to 100 parts by mass of the binder resin. The photosensitive layer may contain only one kind of hole transporting substance, or may contain two or more kinds of hole transporting substances. In addition, the photosensitive layer may further contain a hole transporting substance other than the compound represented by the formula (20), (21), (22), (23), or (24) (hereinafter sometimes referred to as "other hole transporting substance"). Examples of the other hole transporting substance include triphenylamine derivatives, diamine derivatives (e.g., N,N,N',N'-tetraphenylbenzidine derivatives, N,N,N',N'-tetraphenylphenylenediamine derivatives, N,N,N',N'-tetraphenylnaphthylenediamine derivatives, N,N,N',N'-tetraphenylphenanthrylenediamine derivatives, and di(aminophenylethenyl)benzene derivatives), oxadiazole-based compounds (e.g., 2,5-di(4-methylaminophenyl)-1,3,4-oxadiazole), styryl-based compounds (e.g., 9-(4-diethylaminostyryl)anthracene), carbazole-based compounds (e.g., polyvinylcarbazole), organic polysilane compounds, pyrazoline-based compounds (e.g., 1-phenyl-3-(p-dimethylaminophenyl)pyrazoline), hydrazone-based compounds, indole-based compounds, oxazole-based compounds, isoxazole-based compounds, thiazole-based compounds, thiadiazole-based compounds, imidazole-based compounds, pyrazole-based compounds, and triazole-based compounds.

[Additive]

The photosensitive layer may contain an additive as required. Examples of the additive include a UV absorber, an antioxidant, a radical scavenger, a singlet quencher, a softener, a surface modifier, an extender, a thickener, a wax, a donor, a surfactant, a plasticizer, a sensitizer, and a leveling agent. In particular, it is preferred to add a small amount of a compound represented by the following formula (30) (hereinafter sometimes referred to as "compound (T-1)").

(30)

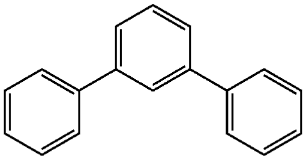

[Toner]

The toner in the present disclosure is characterized in that the toner contains a toner particle, the toner particle includes a core containing a binder resin and a shell covering the surface of the core, and the shell contains at least one resin selected from the group consisting of: a melamine resin; and a resin having a structural unit represented by the formula (3):

(3)

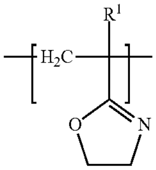

in the formula (3), $R^1$ represents a hydrogen atom, or a substituted or unsubstituted alkyl group having 1 or more and 10 or less carbon atoms.

The toner in the present disclosure may be suitably used for developing an electrostatic latent image. The toner in the present disclosure may be used as a one-component developer. The toner in the present disclosure may be used as a two-component developer by being mixed with a carrier through use of a mixing device (e.g., a ball mill). When the toner is used as a one-component developer, the toner is positively charged by friction with a developing sleeve or a toner charging member in a developing device. An example of the toner charging member is a doctor blade. When the toner is used as a two-component developer, the toner is positively charged by friction with the carrier in the developing device.

[Shell]

In the toner in the present disclosure, the shell covers the surface of the core.

The above-mentioned shell contains at least one resin selected from the group consisting of: a melamine resin; and a resin having a structural unit represented by the formula (3). In the formula (3), $R^1$ represents a hydrogen atom, or a substituted or unsubstituted alkyl group having 1 or more and 10 or less carbon atoms.

The resin for forming the shell may contain a thermosetting resin in order to improve strength. The resin for forming the shell preferably has sufficient positive chargeability.

In the toner in the present disclosure, it is preferred that the toner contain a toner particle, and the surface of the toner particle contain at least one resin selected from the group consisting of: a melamine resin; and a resin having the structural unit represented by the formula (3). For example, the shell preferably contains at least one resin selected from the group consisting of a melamine resin; and a resin having the structural unit represented by the formula (3).

An example of the thermosetting resin is a thermosetting resin having positive chargeability or a thermosetting resin having a nitrogen atom in a molecular skeleton thereof. An example of the thermosetting resin having positive chargeability is a thermosetting resin having an amino group ($—NH_2$). Examples of the thermosetting resin having an amino group include a melamine resin, a derivative of a melamine resin, a guanamine resin, a derivative of a guanamine resin (e.g., a benzoguanamine resin, an acetoguanamine resin, or a spiroguanamine resin), a sulfonamide resin, a urea resin, a derivative of a urea resin (e.g., a glyoxal resin), and an aniline resin. In addition, an example of the thermosetting resin having a nitrogen atom in a molecular skeleton thereof is a thermosetting polyimide resin (e.g., a maleimide-based polymer, a bismaleimide-based polymer, an aminobismaleimide-based polymer, or a bismaleimide triazine-based copolymer). Such thermosetting resins may be used alone or in combination thereof. The melamine resin is preferably used as the thermosetting resin.

The resin for forming the shell may contain a resin having the structural unit represented by the formula (3) in order to improve strength. It is known that the resin having the structural unit represented by the formula (3) contains a non-ring-opened oxazoline group in the structure of the formula (3) and has excellent positive chargeability.

In addition, the resin for forming the shell may contain a resin having a structural unit represented by the formula (3-B). In the formula (3-B), $R^2$ represents a hydrogen atom, or a substituted or unsubstituted alkyl group having 1 or more and 10 or less carbon atoms, and $R^0$ represents a bonding site with an atom in the binder resin in the core.

(3-B)

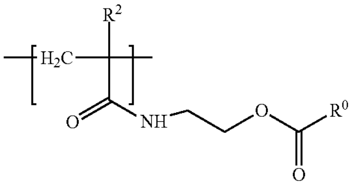

When $R^1$ or $R^2$ in the formula (3) or the formula (3-B) represents an alkyl group having 1 or more and 10 or less carbon atoms, examples thereof include a methyl group, an ethyl group, a n-propyl group, an isopropyl group, a n-butyl group, a sec-butyl group, a tert-butyl group, a n-pentyl group, an isopentyl group, a neopentyl group, a 1,2-dimethylpropyl group, a linear or branched hexyl group, a linear or branched heptyl group, a linear or branched octyl group, a linear or branched nonyl group, and a linear or branched decyl group. $R^1$ preferably represents a hydrogen atom, a methyl group, an ethyl group, or an isopropyl group. $R^2$ preferably represents a hydrogen atom, a methyl group, an ethyl group, or an isopropyl group. It is preferred that the resin for forming the shell include 50 mass % or more of at least one resin selected from the group consisting of: a melamine resin; and a resin having the structural unit represented by the formula (3). Here, an example of the resin having the structural unit represented by the formula (3) is a copolymer of 2-vinyl-2-oxazoline and methyl methacrylate.

[Toner Particle]

Figure 4:
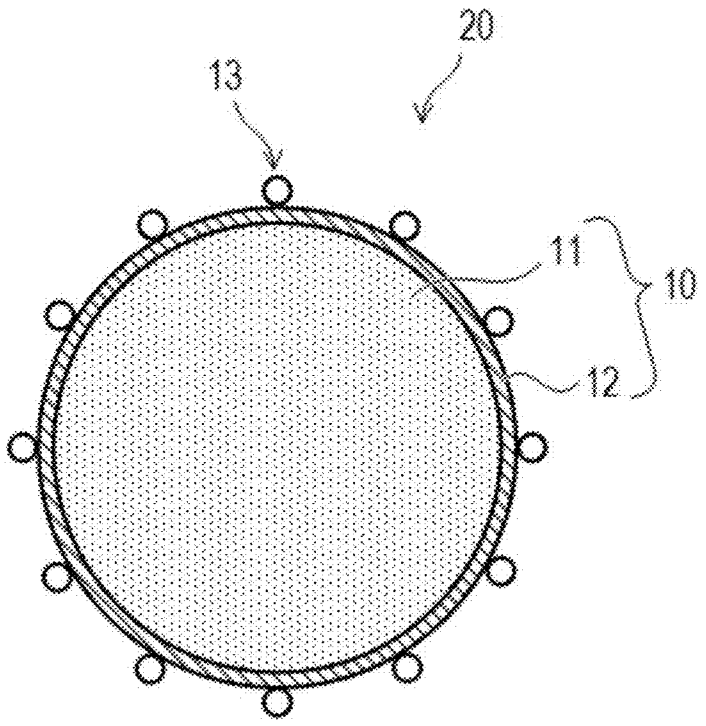
FIG. 4 is a view for illustrating an example of a configuration of toner in the present disclosure.

The toner particle includes a core containing a binder resin and a shell covering the surface of the core. In addition, the toner particle contains a toner base particle. It is preferred that the toner particle further contain an external additive that adheres to the surface of the toner base particle. The external additive contains external additive particles. FIG. 4 is a view for illustrating an example of a sectional structure of a toner particle in the toner of the present embodiment. A toner particle 20 illustrated in FIG. 4 contains a toner base particle 10 and an external additive adhering to the surface of the toner base particle 10. The toner base particle 10 includes a core 11 and a shell 12 covering the surface of the core 11. The shell 12 completely covers the surface of the core 11. The external additive contains external additive particles 13. The structure of the toner particle in the toner has been described above with reference to FIG. 4. However, the toner particle in the toner of the present disclosure may have a structure different from that of the toner particle 20 illustrated in FIG. 4. For example, the shell may partially cover the surface of the core. In addition, the toner particle may not contain an external additive.

The toner of the present disclosure is further described below.

[Toner Base Particle]

The toner base particle includes a core and a shell covering the surface of the core. From the viewpoint of obtaining toner that is further excellent in heat-resistant storage stability while maintaining low-temperature fixability, the thickness of the shell is preferably 1 nm or more and 400 nm or less. The thickness of the shell may be measured by analyzing a transmission electron microscope (TEM) photographed image of a cross-section of a dyed toner particle through use of commercially available image analysis software (e.g., "WinROOF" manufactured by Mitani Corporation). When the thickness of the shell is not uniform in one toner particle, the thickness of the shell is measured at each of four equally spaced positions (specifically, four positions at which two straight lines drawn so as to be orthogonal to each other substantially at the center of the cross-section of the toner particle intersect with the shell). The arithmetic mean of the resultant four measured values may be defined as the evaluation value (thickness of the shell) of the toner particle. The area ratio of a region covered with the shell (coverage of the shell) on the surface of the core is preferably 90% or more and 100% or less, more preferably 95% or more and 100% or less. When the coverage of the shell is 90% or more, toner that is further excellent in heat-resistant storage stability can be obtained. The coverage of the shell may be measured by analyzing a transmission electron microscope (TEM) photographed image of the cross-section of the toner particle through use of commercially available image analysis software (e.g., "WinROOF" manufactured by Mitani Corporation). Specifically, the coverage of the shell is obtained by measuring the ratio of a region covered with the shell of the surface region of the core (contour line indicating an outer edge) in the TEM photographed image of the cross-section of the dyed toner particle. From the viewpoint of forming a satisfactory image, a volume median diameter (D50) of the toner base particle is preferably 4 μm or more and 9 μm or less.

[Core]

The core contains a binder resin. The binder resin in the core may contain a polyester resin. In addition, the binder resin in the core may contain a styrene-acrylic resin. The core may further contain an internal additive (e.g., at least one of a black colorant, another colorant, a release agent, or a charge control agent) as required.

(Polyester Resin)

The polyester resin functions as a binder resin for the toner of the present disclosure. The core contains a polyester resin, for example, as a main component.

The polyester resin is obtained by subjecting one or more kinds of polyhydric alcohols and one or more kinds of polyvalent carboxylic acids to condensation polymerization. Examples of the alcohol for synthesizing the polyester resin include dihydric alcohols (more specifically, for example, diols and bisphenols) and trihydric or higher alcohols as described below. Examples of the carboxylic acid for synthesizing the polyester resin include divalent carboxylic acids and trivalent or higher carboxylic acids as described below. A polyvalent carboxylic acid derivative that can form an ester bond through condensation polymerization, such as a polyvalent carboxylic acid anhydride or a polyvalent carboxylic acid halide, may be used instead of the polyvalent carboxylic acid.

The acid value of the polyester resin is preferably 10 mgKOH/g or more and 30 mgKOH/g or less, more preferably 15 mgKOH/g or more and 25 mgKOH/g or less.

The acid value of the polyester resin may be measured by a method in conformity with Japanese Industrial Standards (JIS) K0070-1992. The acid value of the polyester resin may be adjusted, for example, by changing the kind or amount of the carboxylic acid to be used for synthesizing the polyester resin. Specifically, the acid value of the polyester resin to be synthesized may be increased through use of a carboxylic acid having a large number of carboxy groups in one molecule (e.g., a trivalent or higher carboxylic acid). In addition, the acid value of the polyester resin may be increased by increasing the addition amount of the carboxylic acid with respect to the addition amount of the alcohol.

Suitable examples of the diols include ethylene glycol, diethylene glycol, triethylene glycol, 1,2-propanediol, 1,3-propanediol, 1,4-butanediol, neopentyl glycol, 2-butene-1,4-diol, 1,5-pentanediol, 2-pentene-1,5-diol, 1,6-hexanediol, 1,4-cyclohexanedimethanol, dipropylene glycol, 1,4-benzenediol, polyethylene glycol, polypropylene glycol, and polytetramethylene glycol.

Suitable examples of the bisphenols include bisphenol A, hydrogenated bisphenol A, an ethylene oxide adduct of bisphenol A, and a propylene oxide adduct of bisphenol A.

Suitable examples of the trihydric or higher alcohol include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

Suitable examples of the divalent carboxylic acid include maleic acid, fumaric acid, citraconic acid, itaconic acid, glutaconic acid, phthalic acid, isophthalic acid, terephthalic acid, cyclohexanedicarboxylic acid, adipic acid, sebacic acid, azelaic acid, malonic acid, succinic acid, an alkylsuccinic acid (more specifically, for example, n-butylsuccinic acid, isobutylsuccinic acid, n-octylsuccinic acid, n-dodecylsuccinic acid, or isododecylsuccinic acid), and an alkenylsuccinic acid (more specifically, for example, n-butenylsuccinic acid, isobutenylsuccinic acid, n-octenylsuccinic acid, n-dodecenylsuccinic acid, or isododecenylsuccinic acid).

Suitable examples of the trivalent or more carboxylic acid include 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylenecarboxypropane, 1,2,4-cyclohexanetricarboxylic acid, tetra(methylenecarboxy)methane, 1,2,7,8-octanetetracarboxylic acid, pyromellitic acid, and EMPOL trimer acid.

The core may contain a binder resin other than the polyester resin (hereinafter sometimes referred to as "other binder resin" in the core) in addition to the polyester resin. The other binder resin in the core is preferably a thermoplastic resin. The content ratio of the thermoplastic resins (other binder resin in the core that is a thermoplastic resin and the polyester resin) with respect to the total amount of the binder resins in the core (other binder resin in the core and the polyester resin) is preferably 85 mass % or more. Examples of the other binder resin in the core that is a thermoplastic resin include a styrene-based resin, an acrylic acid ester-based resin, an olefin-based resin (more specifically, for example, a polyethylene resin or a polypropylene resin), a vinyl resin (more specifically, for example, a vinyl chloride resin, a polyvinyl alcohol, a vinyl ether resin, or an N-vinyl resin), a polyamide resin, and a urethane resin. In addition, a copolymer of the above-mentioned respective resins, that is, a copolymer obtained by introducing any repeating unit into each of the above-mentioned resins (more specifically, for example, a styrene-acrylic acid ester-based resin or a styrene-butadiene-based resin) may be used as the other binder resin in the core that is a thermoplastic resin.

(Colorant)

The toner base particle may contain a colorant. A known pigment or dye may be used as the colorant in accordance with the color of the toner. To form a high-quality image through use of the toner, the amount of the colorant is preferably 1 part by mass or more and 20 parts by mass or less, more preferably 2 parts by mass or more and 10 parts by mass or less with respect to 100 parts by mass of the binder resin.

The toner base particle may contain a black colorant. An example of the black colorant is carbon black. In addition, the black colorant may be a colorant toned to black color through use of a yellow colorant, a magenta colorant, and a cyan colorant. The toner base particle may contain a color colorant, such as a yellow colorant, a magenta colorant, or a cyan colorant.

For example, one or more kinds of compounds selected from the group consisting of: a condensed azo compound; an isoindolinone compound; an anthraquinone compound; an azo metal complex; a methine compound; and an arylamide compound may each be used as the yellow colorant. C.I. Pigment Yellow (3, 12, 13, 14, 15, 17, 62, 74, 83, 93, 94, 95, 97, 109, 110, 111, 120, 127, 128, 129, 147, 151, 154, 155, 168, 174, 175, 176, 180, 181, 191, or 194), Naphthol Yellow S, Hansa Yellow G, or C.I. Vat Yellow classified by a color index may be suitably used as the yellow colorant.

One or more kinds of compounds selected from the group consisting of: a condensed azo compound; a diketopyrrolopyrrole compound; an anthraquinone compound; a quinacridone compound; a basic dye lake compound; a naphthol compound; a benzimidazolone compound; a thioindigo compound; and a perylene compound may each be used as the magenta colorant. C.I. Pigment Red (2, 3, 5, 6, 7, 19, 23, 48:2, 48:3, 48:4, 57:1, 81:1, 122, 144, 146, 150, 166, 169, 177, 184, 185, 202, 206, 220, 221, or 254) classified by a color index may be suitably used as the magenta colorant.

For example, one or more kinds of compounds selected from the group consisting of: a copper phthalocyanine compound; an anthraquinone compound; and a basic dye lake compound may each be used as the cyan colorant. C.I. Pigment Blue (1, 7, 15, 15:1, 15:2, 15:3, 15:4, 60, 62, or 66), Phthalocyanine Blue, C.I. Vat Blue, or C.I. Acid Blue classified by a color index may be suitably used as the cyan colorant.

(Release Agent)

The core may contain a release agent. The release agent is used, for example, for the purpose of imparting hot offset resistance to the toner. When the core contains a release agent and a polyester resin, the content of the release agent is preferably 1.0 part by mass or more and 20.0 parts by mass or less with respect to 100 parts by mass of the polyester resin from the viewpoint of imparting further excellent hot offset resistance to the toner. In addition, the content of the release agent is more preferably 5.0 parts by mass or more and 15.0 parts by mass or less with respect to 100 parts by mass of the polyester resin.

For example, the following release agents may be suitably used: aliphatic hydrocarbon-based waxes, such as low-molecular-weight polyethylene, low-molecular-weight polypropylene, a polyolefin copolymer, a polyolefin wax, a microcrystalline wax, a paraffin wax, and a Fischer-Tropsch wax; oxides of aliphatic hydrocarbon-based waxes, such as a polyethylene oxide wax and a block copolymer of a polyethylene oxide wax; plant-based waxes, such as a candelilla wax, a carnauba wax, a haze wax, a jojoba wax, and a rice wax; animal-based waxes, such as beeswax, lanolin, and a spermaceti wax; mineral-based waxes, such as ozokerite, ceresin, and petrolatum; ester waxes each containing a fatty acid ester as a main component, such as a montanic acid ester wax and a castor wax; and partially or wholly deoxidized waxes of fatty acid esters (e.g., a deoxidized carnauba wax). Of those, an ester wax is preferred as the release agent. When the core contains a release agent and a polyester resin, a compatibilizer may be further added to the core for improving the compatibility between the polyester resin and the release agent.

(Charge Control Agent)

The core may contain a charge control agent. The charge control agent is used, for example, for the purpose of providing toner having excellent charging stability or an excellent charging rise characteristic. The charging rise characteristic of the toner serves as an indicator indicating whether or not the toner can be charged to a predetermined charging level within a short period of time. The incorporation of the charge control agent having positive chargeability into the core can strengthen the cationic property of the core. When the core contains a charge control agent and a polyester resin, the content of the charge control agent is preferably 0.1 part by mass or more and 10.0 parts by mass or less with respect to 100 parts by mass of the polyester resin from the viewpoint of providing toner having excellent charging stability.

[External Additive]

The external additive particle is preferably an inorganic particle. The inorganic particle is preferably a silica particle or a particle of a metal oxide (more specifically, for example, alumina, titanium oxide, magnesium oxide, zinc oxide, strontium titanate, or barium titanate), more preferably a silica particle, a titanium oxide particle, a strontium titanate particle, or an alumina particle. The content of the inorganic particles is preferably 0.01 part by mass or more and 10 parts by mass or less, more preferably 0.1 part by mass or more and 5 parts by mass or less with respect to 100 parts by mass of the toner base particles.

<Method of Producing Toner>

An example of a method of producing the toner according to the present disclosure is described. The method of producing the toner includes: a core preparation step of preparing a core; and a shell formation step of forming a shell on the surface of the core to provide a toner base particle. The method of producing the toner may further include an external addition step of externally adding an external additive to the surface of the toner base particle after the shell formation step.

[Core Preparation Step]

A method of preparing the core is not particularly limited, and any known pulverization method or aggregation method may be used. The pulverization method is preferred as the method of producing the core. An example of the pulverization method is described below. First, a polyester resin, a black colorant, and an internal additive to be added as required are mixed. Subsequently, the resultant mixture is subjected to melt-kneading with a melt-kneading device (e.g., a single-screw or twin-screw extruder). Subsequently, the resultant melt-kneaded product is pulverized and classified. As a result, a core is obtained. An example of the aggregation method is described below. First, in an aqueous medium containing fine particles of a binder resin, a colorant, and an internal additive, which is added as required, to be used in a core, these fine particles are aggregated until a desired particle diameter is achieved. As a result, aggregated particles containing the binder resin and the like are formed.

Subsequently, the resultant aggregated particles are heated to cause the components in the aggregated particles to coalesce with each other. As a result, a core is obtained.

[Shell Formation Step]

An example of a method of forming the shell is a method involving mixing a core and a shell forming solution in an aqueous medium. The shell forming solution contains a resin for forming a shell (shell forming resin). The shell forming resin is, for example, a melamine resin or a resin having the structural unit represented by the formula (3). The shell forming resin also functions as a dispersant and can react with the core even in an aqueous medium free of a dispersant (e.g., a surfactant) or an organic solvent. In addition, a surfactant or the like may be added as the dispersant. It is preferred that a mixed liquid of the core and the shell forming solution be heated. When the core and the shell forming solution are mixed, a shell is formed on the surface of the core to provide a dispersion liquid containing a toner base particle. When the resultant dispersion liquid is subjected to solid-liquid separation, washing, and drying, the toner base particle is obtained. It is preferred that the dispersion liquid (dispersion liquid containing the core and the shell forming solution) further contain a basic substance.

(External Addition Step)

In the external addition step, an external additive is caused to adhere to the surface of the toner base particle. As a result, a toner particle containing the toner base particle and the external additive adhering to the surface of the toner base particle is obtained. A method of causing the external additive to adhere to the surface of the toner base particle is not particularly limited, and for example, a method involving stirring the toner base particle and the external additive with a mixer or the like is used.

[Electrophotographic Apparatus]

The present disclosure is described below in detail based on an illustrated embodiment.

Figure 5:
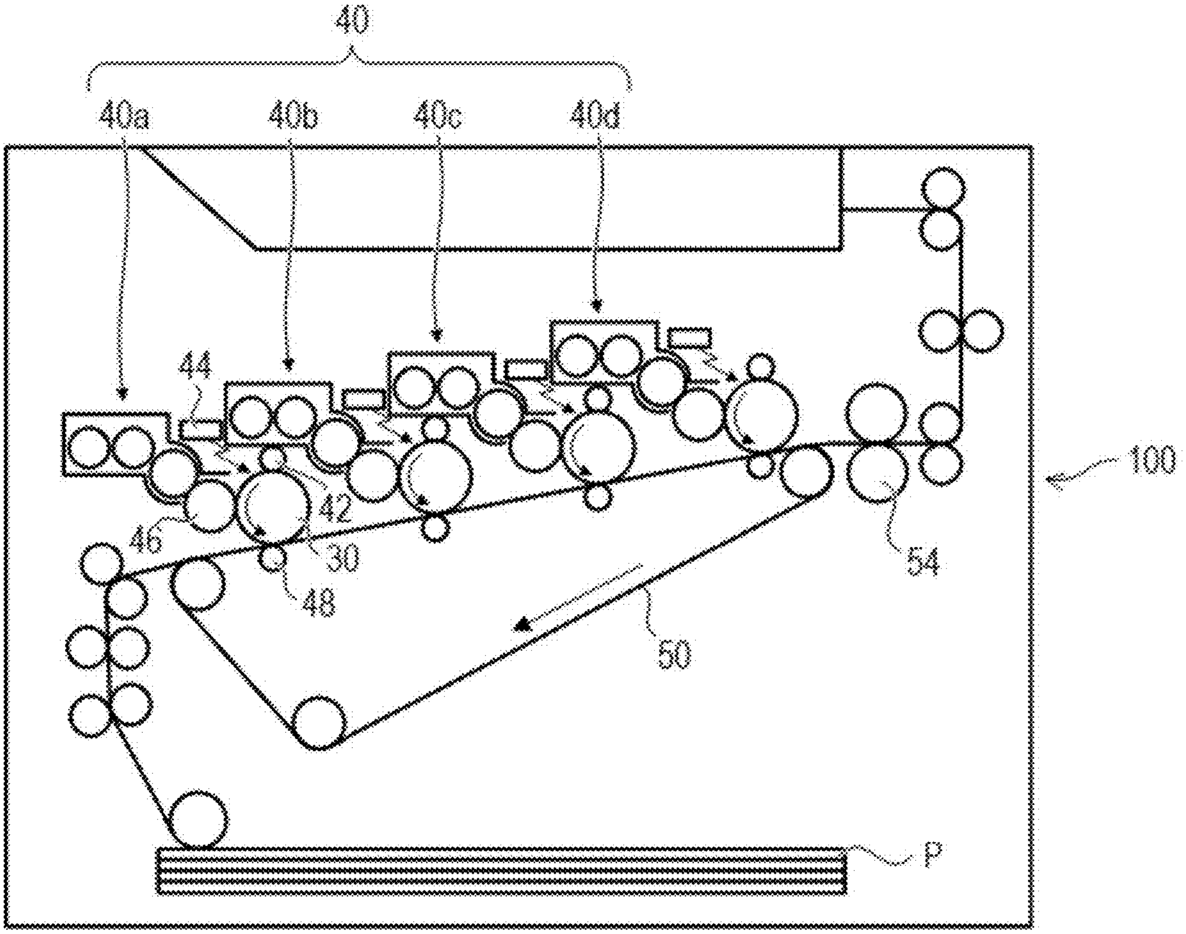
FIG. 5 is a view for illustrating an example of a schematic configuration of an electrophotographic apparatus including an electrophotographic photosensitive member according to the present disclosure.

A tandem-type color electrophotographic apparatus is described as an example with reference to FIG. 5. FIG. 5 is a sectional view for illustrating an example of an electrophotographic apparatus. An electrophotographic apparatus 100 illustrated in FIG. 5 includes image forming units 40*a*, 40*b*, 40*c*, and 40*d*, a transfer belt 50, and a fixing device 54. When distinction is not required, each of the image forming units 40*a*, 40*b*, 40*c*, and 40*d* is hereinafter described as an image forming unit 40. The image forming unit 40 includes an image bearing member 30, a charging device 42 serving as a charging unit, an exposing device 44 serving as an exposing unit, a developing device 46 serving as a developing unit, and a transfer device 48 serving as a transfer unit. The image bearing member 30 is a photosensitive member (specifically, a monolayer type photosensitive member). In addition, a recording medium P is located in a lower portion of the electrophotographic apparatus. The image bearing member 30 is arranged at the center position of the imaging forming unit 40. The image bearing member 30 is arranged so as to be rotatable in the arrow direction (counterclockwise direction in FIG. 5). The charging device 42, the exposing device 44, the developing device 46, and the transfer device 48 are arranged on the periphery of the image bearing member 30 in the stated order from an upstream side in the rotation direction of the image bearing member 30.

Toner images of a plurality of colors (e.g., four colors of black, cyan, magenta, and yellow) are successively superimposed on the recording medium P on the transfer belt 50 by each of the image forming units 40*a* to 40*d*. The charging device 42 charges the surface (e.g., a peripheral surface) of the image bearing member 30 with positive polarity. When the image bearing member 30 is a monolayer type photosensitive member, the surface of the image bearing member 30 is charged with positive polarity. The charging device 42 is, for example, a charging roller. The exposing device 44 irradiates the charged surface of the image bearing member 30 with exposure light. That is, the exposing device 44 exposes the charged surface of the image bearing member 30 to light. As a result, an electrostatic latent image is formed on the surface of the image bearing member 30. The electrostatic latent image is formed based on image data input to the electrophotographic apparatus 100. The developing device 46 includes toner and supplies the toner to the surface of the image bearing member 30, to thereby develop the electrostatic latent image as a toner image. The developing device 46 (e.g., the surface of the developing device 46, more specifically, the circumferential surface of the developing device 46) is in contact with the surface of the image bearing member 30. That is, the electrophotographic apparatus 100 adopts a contact developing system. The developing device 46 is, for example, a developing roller. When a developer is a one-component developer, the developing device 46 supplies toner that is a one-component developer to the electrostatic latent image formed on the image bearing member 30. When the developer is a two-component developer, the developing device 46 supplies toner among the toner and a carrier in the two-component developer to the electrostatic latent image formed on the image bearing member 30. In this manner, the image bearing member 30 bears the toner image. The transfer belt 50 conveys the recording medium P to the position between the image bearing member 30 and the transfer device 48. The transfer belt 50 is an endless belt. The transfer belt 50 is arranged so as to be rotatable in the arrow direction (clockwise direction in FIG. 5). The transfer device 48 transfers the toner image developed by the developing device 46 from the surface of the image bearing member 30 to a transfer target member. The transfer target member is the recording medium P. When the toner image is transferred, the image bearing member 30 is in contact with the recording medium P. That is, the electrophotographic apparatus 100 adopts a direct transfer system. The transfer device 48 is, for example, a transfer roller. The recording medium P having the toner image transferred thereto by the transfer device 48 is conveyed to the fixing device 54 by the transfer belt 50. The fixing device 54 is, for example, a heating roller and/or a pressure roller. The unfixed toner image having been transferred by the transfer device 48 is heated and/or pressurized by the fixing device 54. The toner image is fixed to the recording medium P by being heated and/or pressurized. As a result, an image is formed on the recording medium P.

An example of the electrophotographic apparatus has been described above, but the electrophotographic apparatus is not limited to the electrophotographic apparatus 100 described above. The electrophotographic apparatus 100 described above is a color electrophotographic apparatus, but the electrophotographic apparatus may also be a monochrome electrophotographic apparatus. In this case, it is only required that the electrophotographic apparatus include, for example, only one image forming unit. In addition, the electrophotographic apparatus 100 described above adopts a tandem system, but the electrophotographic apparatus may also adopt, for example, a rotary system. The charging device 42 has been described by taking the charging roller as an example, but the charging device may be a charging device other than the charging roller (e.g., a scorotron charger, a charging brush, or a corotron charger). The electrophotographic apparatus 100 described above adopts a contact developing system, but the electrophotographic apparatus may also adopt a non-contact developing system. The electrophotographic apparatus 100 described above adopts a direct transfer system, but the electrophotographic apparatus may also adopt an intermediate transfer system. When the electrophotographic apparatus adopts an intermediate transfer system, the transfer target member corresponds to an intermediate transfer belt. The electrophotographic apparatus does not include a cleaning member in the image forming unit 40 described above, but the image forming unit 40 may further include a cleaning member (e.g., a cleaning blade). The image forming unit 40 described above does not include a charge-eliminating device, but the image forming unit may further include a charge-eliminating device.

[Process Cartridge]

A process cartridge according to the present disclosure is a process cartridge including: an electrophotographic photosensitive member; and a developing unit, which includes toner, and which is configured to form a toner image on a surface of the electrophotographic photosensitive member with the toner, the process cartridge integrally supporting the electrophotographic photosensitive member and the developing unit, and being detachably attachable onto a main body of an electrophotographic apparatus, wherein the electrophotographic photosensitive member includes a monolayer type photosensitive layer containing a charge generating substance, a hole transporting substance, an electron transporting substance, and a binder resin, wherein the photosensitive layer contains, as the binder resin, a polyarylate resin having a structural unit represented by the following formula (1) and a structural unit represented by the following formula (2), wherein the toner contains a toner particle, wherein the toner particle includes a core containing a binder resin and a shell covering a surface of the core, and wherein the shell contains at least one resin selected from the group consisting of: a melamine resin; and a resin having a structural unit represented by the following formula (3):

(1)

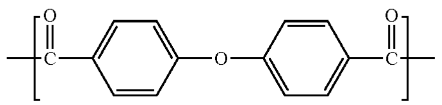

(2)

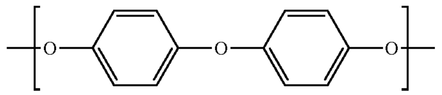

(3)

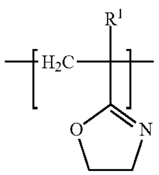

in the formula (3), $R^1$ represents a hydrogen atom, or a substituted or unsubstituted alkyl group having 1 or more and 10 or less carbon atoms.

A process cartridge according to the present disclosure is a process cartridge including: an electrophotographic photosensitive member; and a developing unit, which includes toner, and which is configured to form a toner image on a surface of the electrophotographic photosensitive member with the toner, the process cartridge integrally supporting the electrophotographic photosensitive member and the developing unit, and being detachably attachable onto a main body of an electrophotographic apparatus, wherein the electrophotographic photosensitive member includes a monolayer type photosensitive layer containing a charge generating substance, a hole transporting substance, an electron transporting substance, and a binder resin, wherein the photosensitive layer contains, as the binder resin, a polyarylate resin having a structural unit represented by the following formula (1) and a structural unit represented by the following formula (2), wherein the toner contains a toner particle, and wherein a surface of the toner particle contains at least one resin selected from the group consisting of: a melamine resin; and a resin having a structural unit represented by the following formula (3).

(1)

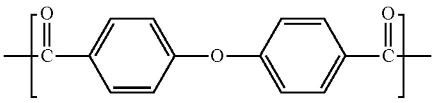

(2)

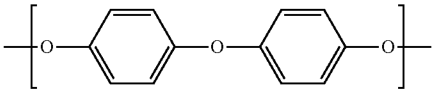

(3)

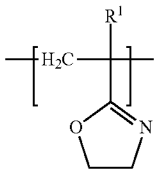

in the formula (3), $R^1$ represents a hydrogen atom, or a substituted or unsubstituted alkyl group having 1 or more and 10 or less carbon atoms.

With continued reference to FIG. 5, an example of a process cartridge according to the embodiment of the present disclosure is described. The process cartridge corresponds to each of the image forming units 40*a* to 40*d*. The process cartridge includes the image bearing member 30 and the developing device 46. The image bearing member 30 is the photosensitive member of the first embodiment. The process cartridge may further include the charging device 42 in addition to the image bearing member 30 and the developing device 46. The process cartridge may further include a cleaning member (not shown) and a charge-eliminating device (not shown). The process cartridge is designed so as to be detachably attachable onto the electrophotographic apparatus 100. Thus, the process cartridge is easy to handle and can be easily and quickly replaced together with the image bearing member 30 when the sensitivity characteristic and the like of the image bearing member 30 deteriorate. The process cartridge including a photosensitive member has been described above with reference to FIG. 5.

According to the present disclosure, there can be provided an excellent electrophotographic apparatus in which a decrease in transfer efficiency after endurance is suppressed and high image quality is maintained from an initial stage to a stage after endurance in an electrophotographic apparatus using toner having a core-shell structure.

EXAMPLES

The present disclosure is described below in more detail by way of Examples and Comparative Examples. The invention is by no means limited by the following Examples within a scope not departing from the gist of the present disclosure. In the following description of Examples, the term "part(s)" is by mass unless otherwise specified.

<Production of Polyarylate Resin (PAR)>

[Synthesis of Resin (PAR-1)]

A three-necked flask including a temperature gauge, a three-way cock, and a dropping funnel was used as a reaction vessel. The following materials were loaded into the reaction vessel.

Compound (BP-2) serving as a monomer (41.0 mmol)
2,6-Dimethylphenol (DMP) serving as an end terminator (0.625 mmol)
Sodium hydroxide (98 mmol)
Benzyltributylammonium chloride (0.384 mmol)

Air in the reaction vessel was replaced by an argon gas. Water (300 mL) was added to the contents of the reaction vessel. The contents of the reaction vessel were stirred at 50° C. for 1 hour. The contents of the reaction vessel were cooled to 10° C. to provide an alkaline aqueous solution A1.

Next, a dicarboxylic acid dichloride (32.0 mmol) that was a derivative of the compound (DC-1) serving as a monomer was dissolved in chloroform (150 mL). As a result, a chloroform solution B1 was obtained.

The chloroform solution B1 was slowly dropped into the alkaline aqueous solution A1 over 110 minutes through use of the dropping funnel. The contents of the reaction vessel were stirred for 4 hours to allow a polymerization reaction to proceed while the temperature (liquid temperature) of the contents of the reaction vessel was regulated to 15±5° C. The upper layer (aqueous layer) of the contents of the reaction vessel was removed by decantation. Thus, an organic layer was obtained. Next, ion-exchanged water (400 mL) was loaded into an Erlenmeyer flask. The resultant organic layer was further added to the Erlenmeyer flask. Chloroform (400 mL) and acetic acid (2 mL) were further added to the Erlenmeyer flask. The contents of the Erlenmeyer flask were stirred at room temperature (25° C.) for 30 minutes. The upper layer (aqueous layer) of the contents of the Erlenmeyer flask was removed by decantation. Thus, an organic layer was obtained. The resultant organic layer was washed with ion-exchanged water (1 L) through use of a separating funnel. The washing with ion-exchanged water was repeated five times. Thus, a water-washed organic layer was obtained. Next, the water-washed organic layer was filtered to provide filtrate. The resultant filtrate was slowly dropped into methanol (1 L) to provide a precipitate. The precipitate was taken out by filtration. The precipitate thus taken out was dried in a vacuum at a temperature of 70° C. for 12 hours. As a result, a resin (PAR-1) having a viscosity-average molecular weight of 35,000 was obtained.

[Synthesis of Resin (PAR-7)]

A three-necked flask including a temperature gauge, a three-way cock, and a dropping funnel was used as a reaction vessel. The following materials were loaded into the reaction vessel.

Compound (BP-2) serving as a monomer (28.7 mmol)
Compound (BP-5) serving as a monomer (12.3 mmol)
2,6-Dimethylphenol (DMP) serving as an end terminator (0.413 mmol)
Sodium hydroxide (98 mmol)
Benzyltributylammonium chloride (0.384 mmol)

Air in the reaction vessel was replaced by an argon gas. Water (300 mL) was added to the contents of the reaction vessel. The contents of the reaction vessel were stirred at 50° C. for 1 hour. The contents of the reaction vessel were cooled to 10° C. to provide an alkaline aqueous solution A2.

Next, a dicarboxylic acid dichloride (20.8 mmol) that was a derivative of the compound (DC-1) serving as a monomer, and a dicarboxylic acid dichloride (11.2 mmol) that was a derivative of the compound (DC-4) serving as a monomer were dissolved in chloroform (150 mL). As a result, a chloroform solution B2 was obtained.

The chloroform solution B2 was slowly dropped into the alkaline aqueous solution A2 over 110 minutes through use of the dropping funnel. The contents of the reaction vessel were stirred for 4 hours to allow a polymerization reaction to proceed while the temperature (liquid temperature) of the contents of the reaction vessel was regulated to 15±5° C. The upper layer (aqueous layer) of the contents of the reaction vessel was removed by decantation. Thus, an organic layer was obtained. Next, ion-exchanged water (400 mL) was loaded into an Erlenmeyer flask. The resultant organic layer was further added to the Erlenmeyer flask. Chloroform (400 mL) and acetic acid (2 mL) were further added to the Erlenmeyer flask. The contents of the Erlenmeyer flask were stirred at room temperature (25° C.) for 30 minutes. The upper layer (aqueous layer) of the contents of the Erlenmeyer flask was removed by decantation. Thus, an organic layer was obtained. The resultant organic layer was washed with ion-exchanged water (1 L) through use of a separating funnel. The washing with ion-exchanged water was repeated five times. Thus, a water-washed organic layer was obtained. Next, the water-washed organic layer was filtered to provide filtrate. The resultant filtrate was slowly dropped into methanol (1 L) to provide a precipitate. The precipitate was taken out by filtration. The precipitate thus taken out was dried in a vacuum at a temperature of 70° C. for 12 hours. As a result, a resin (PAR-7) having a viscosity-average molecular weight of 55,000 was obtained.

[Synthesis of Resins (PAR-2) to (PAR-6) and (PAR-8) to (PAR-30)]

Synthesis was performed by the same method as that in the synthesis of the resin (PAR-7) having a viscosity-average molecular weight of 55,000 except that the ratios of the bisphenol and the dicarboxylic acid, and the end terminator were changed. Thus, resins (PARs) having viscosity-average molecular weights shown in Table 1 were obtained. As the loading amount of the end terminator becomes smaller, the viscosity-average molecular weight of each of the resins (PARs) becomes higher.

TABLE 1

| | Bisphenol | | Dicarboxylic acid | | End | Molecular |
|---|---|---|---|---|---|---|
| Resin | BP-2 | BP-5 | DC-1 | DC-4 | terminator | weight |
| PAR-1 | 1.00 | — | 1.00 | — | DMP | 35,000 |
| PAR-2 | 1.00 | — | 1.00 | — | DMP | 50,000 |
| PAR-3 | 1.00 | — | 1.00 | — | DMP | 65,000 |
| PAR-4 | 1.00 | — | 1.00 | — | DMP | 76,000 |
| PAR-5 | 0.70 | 0.30 | 0.90 | 0.10 | DMP | 66,000 |
| PAR-6 | 0.70 | 0.30 | 0.80 | 0.20 | DMP | 65,000 |
| PAR-7 | 0.70 | 0.30 | 0.65 | 0.35 | DMP | 55,000 |
| PAR-8 | 0.70 | 0.30 | 0.50 | 0.50 | DMP | 53,100 |
| PAR-9 | 0.70 | 0.30 | 0.55 | 0.45 | DMP | 66,000 |
| PAR-10 | 0.70 | 0.30 | 0.40 | 0.60 | DMP | 56,000 |
| PAR-11 | 0.70 | 0.30 | 0.30 | 0.70 | DMP | 63,000 |
| PAR-12 | 0.50 | 0.50 | 0.90 | 0.10 | DMP | 60,000 |
| PAR-13 | 0.50 | 0.50 | 0.80 | 0.20 | DMP | 59,000 |
| PAR-14 | 0.50 | 0.50 | 0.65 | 0.35 | DMP | 64,000 |
| PAR-15 | 0.50 | 0.50 | 0.50 | 0.50 | DMP | 61,000 |
| PAR-16 | 0.50 | 0.50 | 0.55 | 0.45 | DMP | 51,000 |
| PAR-17 | 0.50 | 0.50 | 0.40 | 0.60 | DMP | 54,000 |
| PAR-18 | 0.50 | 0.50 | 0.30 | 0.70 | DMP | 62,000 |
| PAR-19 | 0.20 | 0.80 | 0.90 | 0.10 | DMP | 58,000 |
| PAR-20 | 0.20 | 0.80 | 0.80 | 0.20 | DMP | 67,000 |

TABLE 1-continued

| Resin | Bisphenol BP-2 | Bisphenol BP-5 | Dicarboxylic acid DC-1 | Dicarboxylic acid DC-4 | End terminator | Molecular weight |
|---|---|---|---|---|---|---|
| PAR-21 | 0.20 | 0.80 | 0.65 | 0.35 | DMP | 56,000 |
| PAR-22 | 0.20 | 0.80 | 0.70 | 0.30 | DMP | 54,000 |
| PAR-23 | 0.20 | 0.80 | 0.40 | 0.60 | DMP | 66,000 |
| PAR-24 | 0.20 | 0.80 | 0.30 | 0.70 | DMP | 58,000 |
| PAR-25 | 0.20 | 0.80 | 0.30 | 0.70 | DMP | 53,000 |
| PAR-26 | 0.20 | 0.80 | 0.55 | 0.45 | DMP | 67,000 |
| PAR-27 | 0.20 | 0.80 | 0.55 | 0.45 | PFH | 53,000 |
| PAR-28 | — | 1.00 | 0.50 | 0.50 | DMP | 55,000 |
| PAR-29 | 0.50 | 0.50 | — | 1.00 | DMP | 60,000 |
| PAR-30 | — | 1.00 | — | 1.00 | DMP | 68,000 |

The numerical values of bisphenols in Table 1 each indicate the ratio of the amount of substance of each bisphenol to the total amount of substance of two kinds of bisphenols in each of the resins (PAR-1) to (PAR-30). In addition, the numerical values of dicarboxylic acids each indicate the ratio of the amount of substance of each dicarboxylic acid to the total amount of substance of two kinds of dicarboxylic acids. In addition, "PFH" represents 1H,1H-perfluoro-1-heptanol. In addition, the molecular weight indicates a viscosity-average molecular weight.

<Production of Electrophotographic Photosensitive Member>

| [Production of Photosensitive Member 1] The following materials were prepared. | |
|---|---|
| Y-form crystal of titanyl phthalocyanine represented by the formula (CGM-1) serving as a charge generating substance | 2.0 parts by mass |
| Hole transporting substance (H-11) | 70.0 parts by mass |
| Electron transporting substance (E-4) | 50.0 parts by mass |
| Additive (T-1) (Compound (T-1)) | 14.0 parts by mass |
| Polyarylate resin (PAR-1) serving as a binder resin | 100.0 parts by mass |
| Tetrahydrofuran serving as a solvent | 500.0 parts by mass |

The above-mentioned materials were mixed with a rod-shaped sonic oscillator for 20 minutes to provide a dispersion liquid. The dispersion liquid was filtered through a filter having an opening of 5 μm to provide a coating liquid for a photosensitive layer. The coating liquid for a photosensitive layer was applied onto an electroconductive support (drum-shaped support made of aluminum) by a dip coating method (dip coating), and was dried with hot air at 120° C. for 50 minutes. Thus, a photosensitive layer (thickness: 30 m) was formed on the electroconductive support to provide a photosensitive member 1.

(Resin Component Analysis of Photosensitive Member 1)

A $^1$H-NMR spectrum was obtained by $^1$H-nuclear magnetic resonance spectrometry of polymer components recovered from the resultant photosensitive member in deuterated chloroform. The resultant $^1$H-NMR spectrum had peaks at 8.22±0.02 ppm, 7.18±0.02 ppm, 7.16±0.02 ppm, 7.100.02 ppm, 7.06±0.02 ppm, and 7.04±0.02 ppm. Thus, it was specified that the photosensitive member had the structural unit represented by the formula (1) and the structural unit represented by the formula (2). In addition, a ratio between the amounts of substances of the structural unit represented by the formula (1) and the structural unit represented by the formula (2) was 1:1 as shown in Table 1 based on the integration ratios of the above-mentioned peaks.

[Production of Photosensitive Members 2 to 32 and 34 to 36]

Photosensitive members 2 to 32 and 34 to 36 were each produced by the same method as that in the production of the photosensitive member 1 except that the kinds of the charge generating substance, the additive, the hole transporting substance, the electron transporting substance, and the binder resin were changed. The kinds of the charge generating substance, the additive, the hole transporting substance, the electron transporting substance, and the binder resin used are shown in Table 2. The mass of each of the materials used is the same as that of the photosensitive member 1. Production examples of the photosensitive members are shown in Table 2. In the table, "CGM", "HTM", and "ETM" represent a charge generating substance, a hole transporting substance, and an electron transporting substance, respectively, and show compound numbers, respectively.

(Resin Component Analysis of Photosensitive Member 21)

A $^1$H-NMR spectrum was obtained by $^1$H-nuclear magnetic resonance spectrometry of polymer components recovered from the resultant photosensitive member in deuterated chloroform. The resultant $^1$H-NMR spectrum had peaks at 8.22±0.02 ppm, 7.18±0.02 ppm, 7.16±0.02 ppm, 7.10±0.02 ppm, 7.06±0.02 ppm, 7.04±0.02 ppm, 2.28±0.02 ppm, 2.20±0.02 ppm, 1.59±0.02 ppm, and 1.54±0.02 ppm. Thus, it was specified that the photosensitive member had the structural unit represented by the formula (1), the structural unit represented by the formula (2), the structural unit represented by the formula (4), and the structural unit represented by the formula (5). In addition, the ratios of the amounts of substances of the structural unit represented by the formula (1), the structural unit represented by the formula (2), the structural unit represented by the formula (4), and the structural unit represented by the formula (5) were as shown in Table 1 based on the integration ratios of the above-mentioned peaks.

[Production of Photosensitive Member 33]

A photosensitive member 33 was produced by the same method as that in the production of the photosensitive member 1 except that the kind of the binder resin was changed as described below.

| | |
|---|---|
| Polyarylate resin (PAR-30) serving as a binder resin | 50.0 parts by mass |
| Polyarylate resin (PAR-6) serving as a binder resin | 50.0 parts by mass |

TABLE 2

| | PAR resin | CGM | HTM | ETM | Additive |
|---|---|---|---|---|---|
| Photosensitive member-1 | PAR-1 | CGM-1 | H-11 | E-4 | T-1 |
| Photosensitive member-2 | PAR-2 | CGM-1 | H-11 | E-4 | T-1 |
| Photosensitive member-3 | PAR-3 | CGM-1 | H-11 | E-4 | T-1 |
| Photosensitive member-4 | PAR-4 | CGM-1 | H-11 | E-4 | T-1 |
| Photosensitive member-5 | PAR-5 | CGM-1 | H-11 | E-4 | T-1 |
| Photosensitive member-6 | PAR-6 | CGM-1 | H-11 | E-4 | T-1 |
| Photosensitive member-7 | PAR-7 | CGM-1 | H-11 | E-4 | T-1 |
| Photosensitive member-8 | PAR-8 | CGM-1 | H-11 | E-4 | T-1 |
| Photosensitive member-9 | PAR-9 | CGM-1 | H-11 | E-4 | T-1 |
| Photosensitive member-10 | PAR-10 | CGM-1 | H-11 | E-4 | T-1 |
| Photosensitive member-11 | PAR-11 | CGM-1 | H-11 | E-4 | T-1 |
| Photosensitive member-12 | PAR-8 | CGM-1 | H-11 | E-4 | — |
| Photosensitive member-13 | PAR-8 | CGM-1 | H-1 | E-4 | T-1 |
| Photosensitive member-14 | PAR-8 | CGM-1 | H-5 | E-4 | T-1 |
| Photosensitive member-15 | PAR-8 | CGM-1 | H-9 | E-4 | T-1 |
| Photosensitive member-16 | PAR-8 | CGM-1 | H-10 | E-4 | T-1 |
| Photosensitive member-17 | PAR-8 | CGM-1 | H-11 | E-1 | T-1 |

TABLE 2-continued

| | PAR resin | CGM | HTM | ETM | Additive |
|---|---|---|---|---|---|
| Photosensitive member-18 | PAR-8 | CGM-1 | H-11 | E-2 | T-1 |
| Photosensitive member-19 | PAR-8 | CGM-1 | H-11 | E-7 | T-1 |
| Photosensitive member-20 | PAR-8 | CGM-1 | H-11 | E-8 | T-1 |
| Photosensitive member-21 | PAR-14 | CGM-1 | H-11 | E-4 | T-1 |
| Photosensitive member-22 | PAR-15 | CGM-1 | H-11 | E-4 | T-1 |
| Photosensitive member-23 | PAR-16 | CGM-1 | H-11 | E-4 | T-1 |
| Photosensitive member-24 | PAR-19 | CGM-1 | H-11 | E-4 | T-1 |
| Photosensitive member-25 | PAR-20 | CGM-1 | H-11 | E-4 | T-1 |
| Photosensitive member-26 | PAR-21 | CGM-1 | H-11 | E-4 | T-1 |
| Photosensitive member-27 | PAR-22 | CGM-1 | H-11 | E-4 | T-1 |
| Photosensitive member-28 | PAR-23 | CGM-1 | H-11 | E-4 | T-1 |
| Photosensitive member-29 | PAR-24 | CGM-1 | H-11 | E-4 | T-1 |
| Photosensitive member-30 | PAR-25 | CGM-1 | H-11 | E-4 | T-1 |
| Photosensitive member-31 | PAR-26 | CGM-1 | H-11 | E-4 | T-1 |
| Photosensitive member-32 | PAR-27 | CGM-1 | H-11 | E-4 | T-1 |
| Photosensitive member-33 | PAR-30/PAR-6 | CGM-1 | H-11 | E-4 | T-1 |
| Photosensitive member-34 | PAR-28 | CGM-1 | H-11 | E-4 | T-1 |
| Photosensitive member-35 | PAR-29 | CGM-1 | H-11 | E-4 | T-1 |
| Photosensitive member-36 | PAR-30 | CGM-1 | H-11 | E-4 | T-1 |

<Production of Toner>

Toners (TA-1), (TB-1), (TM-1) and (TF-1) were obtained by the following method.

[Production of Toner Base Particles]

First, a polyester resin A to be used for a core was synthesized.

(Synthesis of Polyester Resin A)

A 5 L-volume four-necked flask including a temperature gauge (thermocouple), a nitrogen inlet tube, a dehydration tube, a rectifier, and a stirring device (stirring blade) was used as a reaction vessel. The reaction vessel was set in an oil bath. 1,200 g of 1,2-propanediol, 1,700 g of terephthalic acid, and 3 g of an esterification catalyst (tin(II) dioctanoate) were loaded into the reaction vessel. Subsequently, a temperature in the reaction vessel was increased to 230° C. through use of the oil bath, and the contents of the reaction vessel were subjected to a reaction (specifically, a condensation reaction) for 15 hours under the conditions of a nitrogen atmosphere and a temperature of 230° C. Subsequently, a pressure in the reaction vessel was reduced, and the contents of the reaction vessel were subjected to a reaction under the conditions of a reduced-pressure atmosphere (pressure: 8.0 kPa) and a temperature of 230° C. until the Tm of a reaction product (polyester resin A) reached a predetermined temperature (90° C.). As a result, a polyester resin A having a Tm of 90° C. was obtained.

The acid value of the polyester resin A was measured by a method in conformity with Japanese Industrial Standards (JIS) K0070-1992. The acid value of the polyester resin A was 20 mgKOH/g.

(Preparation of Core A)

The following materials were prepared.

| | |
|---|---|
| Binder resin (polyester resin A) | 80 parts by mass |
| Release agent ("NISSAN ELECTROL (trademark) WEP-3" manufactured by NOF Corporation, component: ester wax) | 9 parts by mass |
| Black colorant ("MA-100" manufactured by Mitsubishi Chemical Corporation, component: acidic carbon black) | 9 parts by mass |

The above-mentioned materials were mixed with an FM mixer ("FM-20B" manufactured by Nippon Coke & Engineering Co., Ltd.) for 4 minutes under the condition of a rotation speed of 2,000 rpm. The resultant mixture was subjected to melt-kneading with a twin-screw extruder ("PCM-30" manufactured by Ikegai Corp) under the conditions of a melt-kneading temperature (cylinder temperature) of 100° C., a rotation speed of 150 rpm, and a treatment speed of 100 g/min. The resultant melt-kneaded product was coarsely pulverized to about 2 mm with a pulverizer ("Rotoplex (trademark)" manufactured by Hosokawa Micron Corporation). The resultant coarsely pulverized product was pulverized with a pulverizer ("Turbo Mill (RS type)" manufactured by Freund-Turbo Corporation). The pulverization conditions of the coarsely pulverized product were set to a mill rotation speed of 12,000 rpm and a loading amount of 2 kg/hour. The resultant pulverized product was classified with an air classifier ("Model EJ-L3" manufactured by Nittetsu Mining Co., Ltd.) to provide a core A having a D50 of 6.7 μm. The core A had a Tm of 90° C. and a Tg of 49° C.

(Preparation of Core B)

A core B was prepared by the same method as that in the preparation of the core A except that a styrene-acrylic resin ("CPR300" manufactured by Mitsui Chemicals, Inc.) was used as the binder resin.

(Formation of Shell of Toner (TA-1): Formation of Toner Base Particle Including Shell Containing Resin Having Structural Unit Represented by Formula (3))

A 1 L-volume three-necked flask including a temperature gauge and a stirring blade was set in a water bath, and 300 mL of ion-exchanged water was loaded into the flask. After that, a temperature in the flask was maintained at 30° C. through use of the water bath. Subsequently, a shell forming solution (EPOCROS (trademark) WS-300 manufactured by Nippon Shokubai Co., Ltd., solid content concentration: 10 mass %) containing a shell forming resin (resin having the structural unit represented by the formula (3)) was added to the flask, and then the contents of the flask were thoroughly stirred. The "EPOCROS WS-300" contains a copolymer of 2-vinyl-2-oxazoline and methyl methacrylate. In the production of the toner (TA-1), the addition amount of the shell forming solution was set to 90 g. The amount of a solid content (shell forming resin) in the added shell forming solution was 3 parts by mass with respect to 100 parts by mass of the toner. Subsequently, 300 g of the core (core A) was added to the flask, and the contents of the flask were stirred at a rotation speed of 200 rpm for 1 hour. After that, 300 mL of ion-exchanged water was added to the flask. Subsequently, an ammonia aqueous solution having a concentration of 1 mass % was added to the flask.

In the production of base particles of the toner (TA-1), 0.1 mL of the ammonia aqueous solution was added. Subsequently, the temperature in the flask was increased to 60° C. at a rate of 0.5° C./min while the contents of the flask were stirred at a rotation speed of 150 rpm. Subsequently, the contents of the flask were stirred at a rotation speed of 100 rpm for 1 hour under a state in which the temperature of 60° C. was kept. Subsequently, a 1 mass % ammonia aqueous solution was added to the flask to adjust the pH of the contents of the flask to 7. Subsequently, the contents of the flask were cooled to normal temperature (about 25° C.) to provide a dispersion liquid containing toner base particles. The dispersion liquid of the toner base particles obtained as described above was subjected to filtration (solid-liquid separation) with a Buchner funnel to provide wet cake-like toner base particles. After that, the resultant wet cake-like toner base particles were redispersed in ion-exchanged water. This dispersion in ion-exchanged water and filtration were repeated five times to wash the toner base particles. Subsequently, the washed toner base particles were dried with a continuous surface modifier ("COATMIZER (trademark)" manufactured by Freund Corporation) under the conditions of a hot air temperature of 45° C. and a blower air volume of 2 $m^3$/min. As a result, powder of the toner base particles of the toner (TA-1) was obtained.

(Formation of Shell of Toner (TB-1): Formation of Toner Base Particle Including Shell Containing Resin Having Structural Unit Represented by Formula (3))

Toner base particles of the toner (TB-1) were prepared by the same method as that of the toner base particles of the toner (TA-1) except that the core B was used.

(Formation of Shell of Toner (TM-1): Formation of Toner Base Particle Including Shell Containing Melamine Resin)

A 1 L-volume three-necked flask including a temperature gauge, a stirrer, and a condenser was set in a water bath at 30° C. 300 mL of ion-exchanged water was loaded into the flask, and hydrochloric acid was further added to the flask to adjust the pH to 4. 2 mL of a hexamethylol melamine precursor (aqueous solution of an initial polymer of hexamethylol melamine, "Mirbane (trademark) Resin SM-607" manufactured by Showa Denko K.K., solid content concentration: 80 mass %) was added as a melamine resin precursor to the resultant acidic aqueous solution, mixed therewith, and dissolved therein. 300 g of the above-mentioned core (core A) was added to the resultant mixed solution so that the thickness of a shell became 6 nm. The resultant mixture was stirred. Further, 300 mL of ion-exchanged water was added thereto, and a temperature in the flask was increased to 60° C. at a rate of temperature increase of 5° C./min while the mixture was stirred. After that, the resultant was stirred at that temperature for 2 hours to form a shell on the surface of the core.

Next, the contents of the flask were cooled to 25° C., and then sodium hydroxide was added to neutralize the contents. After that, suction filtration was performed with a Buchner funnel, and a wet cake containing toner base particles was filtered out. Further, the wet cake containing the toner base particles after the filtration was dispersed with ion-exchanged water. Thus, the toner base particles were washed. Then, the same washing of the toner base particles with ion-exchanged water was repeated six times. The wet cake containing the toner base particles after the washing was dispersed in an ethanol aqueous solution having a concentration of 50 mass %, and was dried with a fine particle surface modifier ("COATMIZER (trademark)" manufactured by Freund Corporation) under the conditions of a hot air temperature of 45° C. and a blower air volume of 2 $m^3$/min. As a result, powder of the toner base particles of the toner (TM-1) was obtained.

(External Addition)

100 Parts by mass of the toner base particles of the toner (TA-1), 1.0 part by mass of dry silica particles ("AEROSIL (trademark) REA90" manufactured by Nippon Aerosil Co., Ltd., D50: 20 nm), and 0.5 part by mass of electroconductive titanium oxide fine particles "EC-100J" manufactured by Titan Kogyo Ltd.) were mixed with an FM mixer ("FM-10B" manufactured by Nippon Coke & Engineering Co., Ltd.) under the conditions of a rotation speed of 3,000 rpm and a jacket temperature of 20° C. After that, the resultant mixture was sieved through a 200-mesh (opening: 75 m) sieve. As a result, a toner (toner (TA-1)) containing toner particles was obtained. In addition, a toner (TB-1) and a toner (TM-1) were also produced and obtained in the same manner.

(Production of Toner (TF-1): Toner Free of Shell)

The following materials were prepared.

| | |
|---|---|
| Binder resin | 100 Parts by weight |
| [60 parts by weight of a polyester resin B (high molecular weight) and of a polyester resin C (low molecular weight)] | 40 parts by weight |
| Magnetic powder (average particle diameter: 0.20 μm) | 80 parts by weight |
| Charge control agent [styrene-acrylic quaternary ammonium salt; product name "FCA222P", manufactured by Fujikura Kasei Co., Ltd.] | 10 parts by weight |
| Polypropylene-based wax [product name "UMEX 100TS", manufactured by Sanyo Chemical Industries, Ltd., local maximum value of an endothermic peak in DSC: 140° C.] | 2.0 parts by weight |
| Ester-based wax [product name "Carnauba Wax No. 1", manufactured by S. Kato & Co., local maximum value of an endothermic peak in DSC: 82° C.] | 4.0 parts by weight |

Those materials were pre-mixed with a Henschel mixer, and then the mixture was subjected to melt-kneading with a twin-screw extruder. After the melt-kneaded product was cooled, the melt-kneaded product was pulverized and classified with a mechanical pulverizer (Turbo Mill) to provide toner particles having an average circularity of 0.955 and a volume-average particle diameter of 7.2 μm. Next, 0.8 part by weight of hydrophobic silica (product name "TG820F", manufactured by Cabot Corporation) was externally added to 100 parts by weight of the above-mentioned toner particles, followed by mixing with a Henschel mixer, to provide a toner (TF-1).

(Synthesis of Polyester Resin B and Polyester Resin C in Toner (TF-1))

A 2.2-mol propylene oxide adduct of bisphenol A (2,000 g), a 2.2-mol ethylene oxide adduct of bisphenol A (800 g), terephthalic acid (500 g), n-dodecenylsuccinic acid (600 g), trimellitic anhydride (350 g), and dibutyltin oxide (4 g) were subjected to a reaction under a nitrogen atmosphere at 220° C. for 8 hours, and were then subjected to a reaction under reduced pressure until a softening point of 155° C. was achieved. Thus, a polyester resin B was obtained. In addition, the 2.2-mol propylene oxide adduct of bisphenol A (2,800 g), terephthalic acid (400 g), fumaric acid (650 g), and dibutyltin oxide (4 g) were subjected to a reaction at 220° C. for 8 hours under a nitrogen atmosphere, and were then subjected to a reaction under reduced pressure until a softening point of 90° C. was achieved. Thus, a polyester resin C was obtained.

(Production of Magnetic Powder in Toner (TF-1))

A caustic soda solution at from 1.0 equivalent to 1.1 equivalents relative to iron ions was mixed into a ferrous sulfate aqueous solution to prepare an aqueous solution containing ferrous hydroxide. Air was blown into the aqueous solution while the pH of the aqueous solution was maintained at about 9, and an oxidation reaction was performed at from 80° C. to 90° C. to prepare a slurry liquid for generating seed crystals. Next, a ferrous sulfate aqueous solution was added to the slurry liquid at from 0.9 equivalent to 1.2 equivalents with respect to the initial amount of an alkali (sodium component of caustic soda). After that, the slurry liquid was maintained at a pH of 8, and an oxidation reaction was allowed to proceed while air was blown into the slurry liquid. Magnetic iron oxide particles generated after the oxidation reaction were washed, filtered, and temporarily taken out. At this time, a small amount of a water-containing sample was collected, and its water content was measured.

Next, this water-containing sample was redispersed in another aqueous medium without being dried, and then the pH of the redispersion liquid was adjusted to about 6. 1.0 Part by mass of a silane coupling agent [n-$C_{10}H_{21}Si(OCH_3)_3$] was added to the magnetic iron oxide (the amount of the magnetic iron oxide was calculated as a value obtained by subtracting the water content from the water-containing sample) while the redispersion liquid was thoroughly stirred. Thus, coupling treatment was performed. Generated hydrophobic iron oxide particles were washed, filtered, and dried by a conventional method, and then slightly aggregated particles were subjected to crushing treatment to provide magnetic powder.

<Observation of Presence or Absence of Shell in Toner Particle>

The presence or absence of a shell in a toner particle may be observed by observing the cross-sectional morphology of the toner particle. A specific method of observing the cross-sectional morphology of the toner particle is as described below.

First, toner particles are sufficiently dispersed in a photocurable epoxy resin, and then the epoxy resin is cured by irradiation with UV light. The resultant cured product is cut with a microtome including a diamond blade to produce a flaky sample having a thickness of 100 nm. The sample is dyed with ruthenium tetroxide as required, and then the cross-section of the toner is observed under the condition of an acceleration voltage of 120 kV with a transmission electron microscope (TEM) (product name: electron microscope Tecnai TF20XT manufactured by FEI Company Japan Ltd.) to provide a TEM image.

In the above-mentioned observation method, when core and shell portions are formed of different components, contrast based on a difference in dyed state or elemental mapping is observed. An observation magnification is set to 20,000 times.

Whether the resin in the shell is at least one resin selected from the group consisting of: a melamine resin; and a vinyl resin containing an oxazoline group may be recognized with a TOF-SIMS (TRIFT-IV manufactured by ULVAC-PHI, Inc.).

Analysis conditions are as described below.

Sample adjustment: The toner is caused to adhere to an indium sheet.

Sample pretreatment: none

Primary ion: $Au^+$

Acceleration voltage: 30 kV

Charge neutralization mode: On

Measurement mode: Positive

Raster size: 100 μm

Integration time: 180 seconds

Through the above-mentioned measurement, the contents of the melamine resin and the oxazoline group in the resin included in the shell of the surface of the toner are calculated from the intensity of a secondary ion mass spectrum (vertical axis: intensity, horizontal axis: mass number=m/z) obtained under the above-mentioned conditions through use of a calibration curve created based on samples having known concentrations.

The results obtained by analyzing the resultant toner by the above-mentioned method are shown in Table 3.

TABLE 3

| | Presence or absence of shell | Structure included in shell |
|---|---|---|
| TA-1 | Present | Resin having structural unit represented by formula (3) |
| TB-1 | Present | Resin having structural unit represented by formula (3) |
| TM-1 | Present | Melamine resin |
| TF-1 | Absent | — |

[Preparation of Two-Component Developer for Evaluating Positive Chargeability]

100 Parts by mass of a carrier for a developer (carrier for "ECOSYS P5026cdw" manufactured by KYOCERA Document Solutions Japan Inc.) and 8 parts by mass of a toner to be evaluated (specifically, any one of a toner (TA-1), (TB-1), (TM-1), or (TF-1)) were mixed with a tumbler mixer for 30 minutes. As a result, a two-component developer for evaluating positive chargeability was prepared.

EXAMPLES

[Evaluation]

Photosensitive members (monolayer type photosensitive members) and toners were each evaluated for positive chargeability and transfer efficiency by methods described below. The photosensitive member was mounted on an evaluation machine. A modified machine of an electrophotographic apparatus ("ECOSYS P5026cdw" manufactured by KYOCERA Document Solutions Japan Inc.) was used as the evaluation machine. This evaluation machine included a charging roller as a charging device. The charging polarity of the charging roller was positive polarity, and the applied voltage of the charging roller was a DC voltage. In addition, this evaluation machine adopted a two-component developing system and an intermediate transfer system. In addition, this evaluation machine included a cleaning blade and a charge-eliminating device.

[Evaluation of Positive Chargeability]

Figure 6:
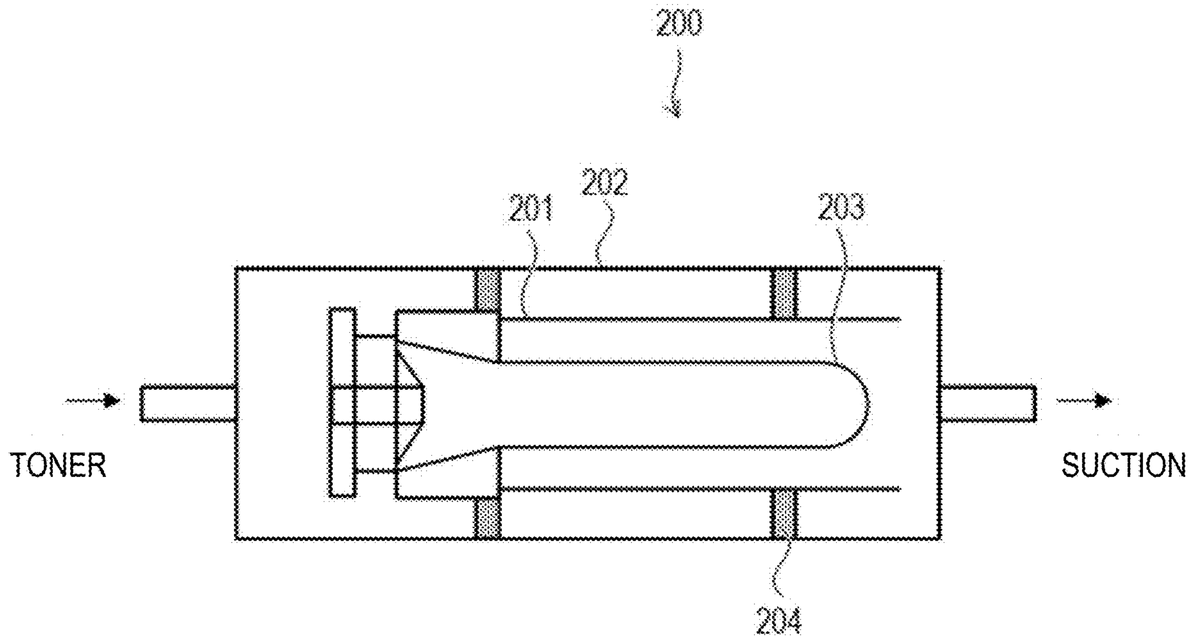
FIG. 6 is a view for illustrating an example of an apparatus that evaluates the chargeability of toner in the present disclosure.

The toner on the photosensitive member was suctioned and collected with a metal cylindrical tube and a cylindrical filter, and the triboelectric charge quantity of the toner and a toner laid-on level were calculated. Specifically, the triboelectric charge quantity of the toner and the toner laid-on level on the photosensitive member were measured with a Faraday-Cage as illustrated in FIG. 6.

Through use of a Faraday-Cage 200 including an inner cylinder 201 and an outer cylinder 202 that are inner and outer double cylinders in which metal cylinders having different shaft diameters are arranged so as to be coaxial with each other, and further including a filter 203 for taking the toner in the inner cylinder 201, the toner on the photosensitive member is suctioned with air. In the Faraday-Cage 200, the inner cylinder 201 and the outer cylinder 202 are insulated from each other by an insulating member 204. When the toner is taken into the filter, electrostatic induction is caused by the charge quantity Q of the toner. When a charged body having the charge quantity Q is placed in the inner cylinder, the situation becomes as if a metal cylinder having the charge quantity Q exists through electrostatic induction. This induced charge quantity was measured with an electrometer (Keithley 6517A manufactured by Keithley Instruments, Inc.), and a charge quantity per unit mass (Q/M) obtained by dividing the charge quantity Q (mC) by a toner mass M (kg) in the inner cylinder was used as the triboelectric charge quantity of the toner.

In addition, a suctioned area S ($cm^2$) was measured, and the toner mass M was divided by the suctioned area S ($cm^2$) to determine a toner laid-on level per unit area.

In the above-mentioned electrophotographic apparatus, the rotation of the photosensitive member was stopped before the toner layer formed on the photosensitive member was transferred onto an intermediate transfer member, and the toner image on the photosensitive member was directly suctioned with air to perform measurement.

Toner laid-on level ($mg/cm^2$)=M/S

Triboelectric charge quantity of toner (mC/kg)=Q/M

In the above-mentioned electrophotographic apparatus, the toner laid-on level on the photosensitive member was adjusted to 0.35 $mg/cm^2$, and the toner was suctioned and collected with the above-mentioned metal cylindrical tube and cylindrical filter. At this time, the charge quantity Q stored in a capacitor through the metal cylindrical tube and the mass M of the collected toner were measured, and the charge quantity per unit mass Q/M (mC/kg) was calculated to determine the charge quantity per unit mass Q/M (mC/kg) on the photosensitive member (initial evaluation).

After the above-mentioned evaluation (initial evaluation) was performed, a strip chart with an image ratio of 0.1% was output onto 30,000 sheets of A4 paper with the above-mentioned electrophotographic apparatus as an endurance evaluation. The charge quantity per unit mass Q/M on the photosensitive member was measured at the same DC voltage VDC as that for the initial evaluation (evaluation after endurance).

[Transfer Efficiency]

A strip chart with an image ratio of 0.1% was output onto five sheets of A4 paper with the above-mentioned electrophotographic apparatus as an initial evaluation. After that, the evaluation image was formed on the photosensitive member and transferred onto an intermediate transfer member, and the evaluation machine was stopped before the evaluation image was transferred onto recording paper. The intermediate transfer member of the stopped evaluation machine was taken out. A transparent pressure-sensitive adhesive tape was bonded to the transferred image to collect the toner, and the pressure-sensitive adhesive tape was bonded to recording paper together with the toner (evaluation of initial transfer efficiency).

A strip chart with an image ratio of 0.1% was output onto 30,000 sheets of A4 paper as an endurance evaluation. After that, the evaluation image was formed on the photosensitive member and transferred onto an intermediate transfer member, and the evaluation machine was stopped before the evaluation image was transferred onto recording paper. The intermediate transfer member of the stopped evaluation machine was taken out. A transparent pressure-sensitive adhesive tape was bonded to the transferred image to collect the toner, and the pressure-sensitive adhesive tape was bonded to recording paper together with the toner (evaluation of transfer efficiency after endurance).

The density of the image was measured with an optical density system, and the density in a portion of the recording paper to which only the pressure-sensitive adhesive tape was bonded was subtracted from the measured density to determine a transfer density A. In addition, the photosensitive member of the evaluation machine was taken out, and transfer residual toner was also determined for a transfer residual density B by the same method. Superstick (manufactured by LINTEC Corporation) which was transparent and had weak pressure-sensitive adhesion was used as the pressure-sensitive adhesive tape, and an X-Rite color reflection densitometer (manufactured by X-Rite Inc.) was used as an optical densitometer. Then, the transfer efficiency was calculated by the following formula. The resultant transfer efficiency was evaluated in accordance with the following evaluation criteria. The transfer efficiency was calculated as {transfer density A/(transfer density A+transfer residual density B)}×100.

The evaluation results are shown in Table 4.

TABLE 4

| | Toner | Photosensitive member | Toner charge quantity Q/M [mCKg] Initial | After endurance | Decrease ratio |
|---|---|---|---|---|---|
| Example 1 | TA-1 | Photosensitive member 1 | 35.8 | 32.2 | 10.1% |
| Example 2 | TA-1 | Photosensitive member 2 | 36.7 | 32.4 | 11.7% |
| Example 3 | TA-1 | Photosensitive member 3 | 36.6 | 32.5 | 11.2% |
| Example 4 | TA-1 | Photosensitive member 4 | 36.8 | 32.3 | 12.2% |
| Example 5 | TA-1 | Photosensitive member 5 | 36.9 | 33.0 | 10.6% |
| Example 6 | TA-1 | Photosensitive member 6 | 36.6 | 32.9 | 10.1% |
| Example 7 | TA-1 | Photosensitive member 7 | 36.8 | 32.3 | 12.2% |
| Example 8 | TA-1 | Photosensitive member 8 | 36.8 | 32.4 | 12.0% |
| Example 9 | TA-1 | Photosensitive member 9 | 36.5 | 32.5 | 11.0% |
| Example 10 | TA-1 | Photosensitive member 10 | 36.8 | 32.9 | 10.6% |
| Example 11 | TA-1 | Photosensitive member 11 | 36.7 | 32.4 | 11.7% |
| Example 12 | TB-1 | Photosensitive member 9 | 35.5 | 31.6 | 11.0% |
| Example 13 | TA-1 | Photosensitive member 24 | 36.6 | 32.5 | 11.2% |
| Example 14 | TA-1 | Photosensitive member 25 | 36.8 | 32.3 | 12.2% |
| Example 15 | TA-1 | Photosensitive member 26 | 36.9 | 33.0 | 10.6% |
| Example 16 | TA-1 | Photosensitive member 27 | 36.6 | 32.9 | 10.1% |
| Example 17 | TA-1 | Photosensitive member 28 | 36.8 | 32.9 | 10.6% |
| Example 18 | TA-1 | Photosensitive member 29 | 36.7 | 32.4 | 11.7% |
| Example 19 | TA-1 | Photosensitive member 30 | 36.7 | 32.4 | 11.7% |
| Example 20 | TA-1 | Photosensitive member 33 | 36.7 | 32.4 | 11.7% |
| Example 21 | TM-1 | Photosensitive member 12 | 36.8 | 32.5 | 11.7% |
| Example 22 | TM-1 | Photosensitive member 13 | 36.9 | 32.3 | 12.5% |
| Example 23 | TM-1 | Photosensitive member 17 | 36.5 | 33.0 | 9.6% |
| Example 24 | TM-1 | Photosensitive member 19 | 36.5 | 32.5 | 11.0% |
| Comparative Example 1 | TA-1 | Photosensitive member 34 | 36.5 | 32.9 | 9.9% |
| Comparative Example 2 | TA-1 | Photosensitive member 35 | 36.8 | 32.4 | 12.0% |
| Comparative Example 3 | TA-1 | Photosensitive member 36 | 36.7 | 32.5 | 11.4% |
| Comparative Example 4 | TM-1 | Photosensitive member 34 | 36.8 | 32.3 | 12.2% |
| Comparative Example 5 | TF-1 | Photosensitive member 8 | 31.5 | 24.3 | 22.9% |
| Comparative Example 6 | TF-1 | Photosensitive member 34 | 31.2 | 24.6 | 21.2% |
| Comparative Example 7 | TF-1 | Photosensitive member 35 | 30.7 | 23.2 | 24.4% |
| Comparative Example 8 | TF-1 | Photosensitive member 36 | 30.8 | 23.6 | 23.4% |

TABLE 4-continued

| | Toner | Photosensitive member | Transfer efficiency [%] Initial | After endurance | Decrease ratio |
|---|---|---|---|---|---|
| Example 1 | TA-1 | Photosensitive member 1 | 95.2% | 93.9% | 1.37% |
| Example 2 | TA-1 | Photosensitive member 2 | 95.5% | 94.2% | 1.36% |
| Example 3 | TA-1 | Photosensitive member 3 | 95.8% | 94.4% | 1.46% |
| Example 4 | TA-1 | Photosensitive member 4 | 95.4% | 94.0% | 1.47% |
| Example 5 | TA-1 | Photosensitive member 5 | 95.6% | 94.2% | 1.46% |
| Example 6 | TA-1 | Photosensitive member 6 | 95.7% | 94.3% | 1.46% |
| Example 7 | TA-1 | Photosensitive member 7 | 95.6% | 94.2% | 1.46% |
| Example 8 | TA-1 | Photosensitive member 8 | 95.2% | 93.5% | 1.79% |
| Example 9 | TA-1 | Photosensitive member 9 | 95.2% | 93.5% | 1.79% |
| Example 10 | TA-1 | Photosensitive member 10 | 95.2% | 93.0% | 2.31% |
| Example 11 | TA-1 | Photosensitive member 11 | 95.3% | 93.0% | 2.41% |
| Example 12 | TB-1 | Photosensitive member 9 | 93.7% | 92.0% | 1.81% |
| Example 13 | TA-1 | Photosensitive member 24 | 95.8% | 94.4% | 1.46% |
| Example 14 | TA-1 | Photosensitive member 25 | 95.4% | 94.0% | 1.47% |
| Example 15 | TA-1 | Photosensitive member 26 | 95.6% | 94.2% | 1.46% |
| Example 16 | TA-1 | Photosensitive member 27 | 95.7% | 94.3% | 1.46% |
| Example 17 | TA-1 | Photosensitive member 28 | 95.2% | 93.0% | 2.31% |
| Example 18 | TA-1 | Photosensitive member 29 | 95.2% | 93.0% | 2.31% |
| Example 19 | TA-1 | Photosensitive member 30 | 95.3% | 93.0% | 2.41% |
| Example 20 | TA-1 | Photosensitive member 33 | 95.3% | 92.0% | 3.46% |
| Example 21 | TM-1 | Photosensitive member 12 | 95.2% | 93.3% | 2.00% |
| Example 22 | TM-1 | Photosensitive member 13 | 95.4% | 93.7% | 1.78% |
| Example 23 | TM-1 | Photosensitive member 17 | 95.2% | 93.5% | 1.79% |
| Example 24 | TM-1 | Photosensitive member 19 | 95.7% | 94.0% | 1.78% |
| Comparative Example 1 | TA-1 | Photosensitive member 34 | 95.0% | 84.5% | 11.05% |
| Comparative Example 2 | TA-1 | Photosensitive member 35 | 95.2% | 84.3% | 11.45% |
| Comparative Example 3 | TA-1 | Photosensitive member 36 | 95.7% | 82.9% | 13.38% |
| Comparative Example 4 | TM-1 | Photosensitive member 34 | 95.2% | 84.5% | 11.24% |
| Comparative Example 5 | TF-1 | Photosensitive member 8 | 90.3% | 82.3% | 8.86% |
| Comparative Example 6 | TF-1 | Photosensitive member 34 | 90.4% | 72.0% | 20.35% |
| Comparative Example 7 | TF-1 | Photosensitive member 35 | 90.5% | 71.8% | 20.66% |
| Comparative Example 8 | TF-1 | Photosensitive member 36 | 90.2% | 71.5% | 20.73% |

In each of Examples 1 to 24 using the photosensitive member containing the polyarylate resin, and the toner in the present disclosure, a decrease in transfer efficiency was suppressed, and the quality of an output image was maintained from an initial stage to a stage after endurance.

Meanwhile, in each of Comparative Examples, a decrease in transfer efficiency was large.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2023-187003, filed Oct. 31, 2023, and No. 2024-177323, filed Oct. 9, 2024, which are hereby incorporated by reference herein in their entirety.

What is claimed is:

1. An electrophotographic apparatus comprising:

an electrophotographic photosensitive member;

a charging unit configured to charge a surface of the electrophotographic photosensitive member;

an exposing unit configured to irradiate the charged surface of the electrophotographic photosensitive member with light to form an electrostatic latent image on the surface of the electrophotographic photosensitive member;

a developing unit, which includes toner, and which is configured to develop the electrostatic latent image formed on the surface of the electrophotographic photosensitive member with the toner to form a toner image on the surface of the electrophotographic photosensitive member; and a transfer unit configured to transfer the toner image from the surface of the electrophotographic photosensitive member onto a transfer target member, wherein the electrophotographic photosensitive member includes a monolayer type photosensitive layer containing a charge generating substance, a hole transporting substance, an electron transporting substance, and a binder resin, wherein the photosensitive layer contains, as the binder resin, a polyarylate resin having a structural unit represented by formula (1) and a structural unit represented by formula (2), wherein the toner contains a toner particle, wherein the toner particle includes a core containing a binder resin and a shell covering a surface of the core, and wherein the shell contains at least one resin selected from the group consisting of a melamine resin and a resin having a structural unit represented by formula (3):

(1)

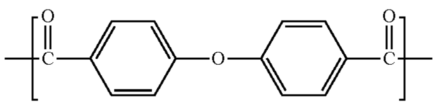

(2)

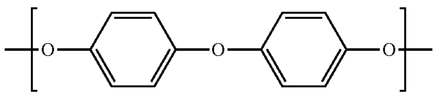

(3)

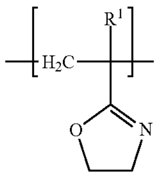

in formula (3), $R^1$ represents a hydrogen atom, or a substituted or unsubstituted alkyl group having 1 or more and 10 or less carbon atoms.

2. The electrophotographic apparatus according to claim 1, wherein the polyarylate resin further has a structural unit represented by formula (4) and a structural unit represented by formula (5)

(4)

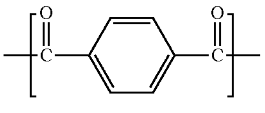

(5)

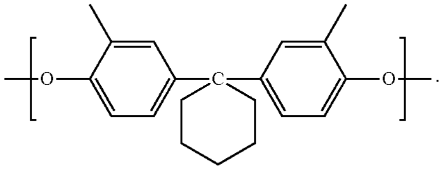

3. The electrophotographic apparatus according to claim 2, wherein, when a ratio of an amount of substance of the structural unit represented by the formula (4) to a total amount of substance of the structural unit represented by the formula (1) and the structural unit represented by the formula (4) in the polyarylate resin is represented by M4, the M4 satisfies 0.30≤M4≤0.70.

4. The electrophotographic apparatus according to claim 2, wherein, when a ratio of an amount of substance of the structural unit represented by the formula (2) to a total amount of substance of the structural unit represented by the formula (2) and the structural unit represented by the formula (5) in the polyarylate resin is represented by M2, the M2 satisfies 0≤M2≤0.50.

5. The electrophotographic apparatus according to claim 1, wherein a ratio of an amount of substance of the structural unit represented by formula (1) is 0.50 or more with respect to a total amount of substance of a structural unit derived from a dicarboxylic acid for forming the polyarylate resin.

6. The electrophotographic apparatus according to claim 1, wherein a ratio of the polyarylate resin is 50 mass % or more with respect to a total mass of the binder resin.

7. The electrophotographic apparatus according to claim 1, wherein the electron transporting substance contains at least one compound selected from the group consisting of a compound represented by formula (10), a compound represented by formula (11), a compound represented by formula (12), a compound represented by formula (13), a compound represented by formula (14), a compound represented by formula (15), and a compound represented by formula (16):

(10)

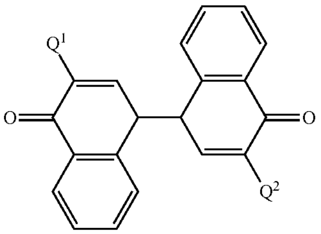

-continued (11)

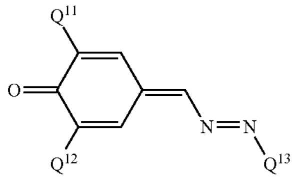

(12)

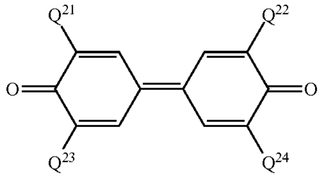

(13)

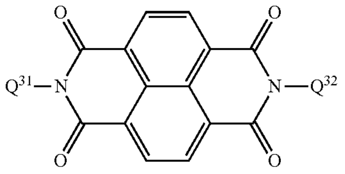

(14)

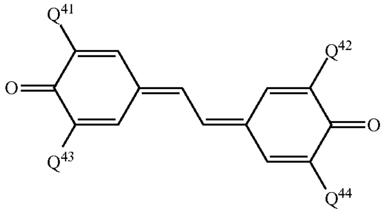

(15)

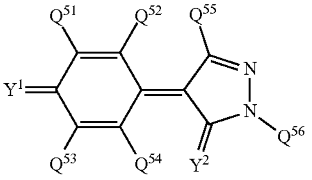

(16)

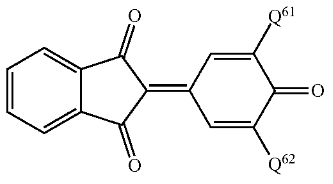

where $Q^1$ and $Q^2$ in formula (10), $Q^{11}$, $Q^{12}$, and $Q^{13}$ in formula (11), $Q^{21}$, $Q^{22}$, $Q^{23}$, and $Q^{24}$ in formula (12), $Q^{31}$ and $Q^{32}$ in formula (13), $Q^{41}$, $Q^{42}$, $Q^{43}$, and $Q^{44}$ in formula (14), $Q^{51}$, $Q^{52}$, $Q^{53}$, $Q^{54}$, $Q^{55}$, and $Q^{56}$ in formula (15), and $Q^{61}$ and $Q^{62}$ in formula (16) each independently represent a hydrogen atom, a halogen atom, a cyano group, an alkyl group having 1 or more and 6 or less carbon atoms, an alkenyl group having 2 or more and 6 or less carbon atoms, an alkoxy group having 1 or more and 6 or less carbon atoms, or an aryl group having 6 or more and 14 or less carbon atoms that may be substituted with at least one substituent selected from the group consisting of: an alkyl group having 1 or more and 6 or less carbon atoms; and a halogen atom, and $Y^1$ and $Y^2$ in formula (15) each independently represent an oxygen atom or a sulfur atom.

8. The electrophotographic apparatus according to claim 1, wherein the electron transporting substance contains at least one compound selected from the group consisting of a compound represented by formula (E-1), a compound represented by formula (E-2), a compound represented by formula (E-3), a compound represented by formula (E-4), a compound represented by formula (E-5), a compound represented by formula (E-6), a compound represented by formula (E-7), and a compound represented by formula (E-8)

(E-1)

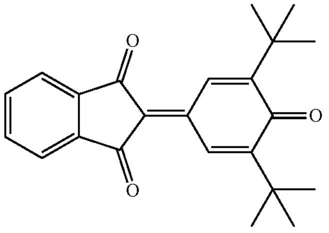

(E-2)

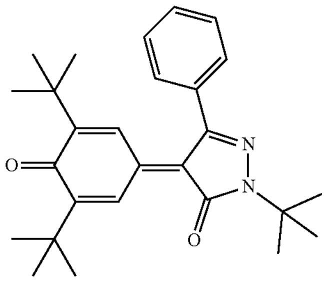

(E-3)

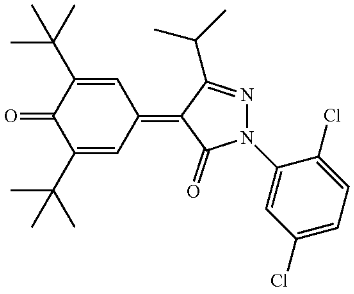

(E-4)

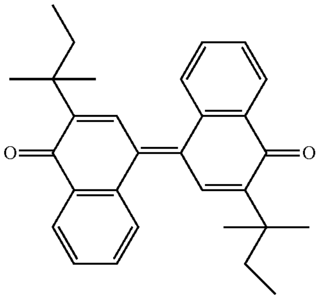

-continued (E-5)

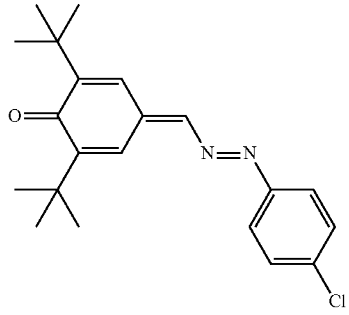

(E-6)

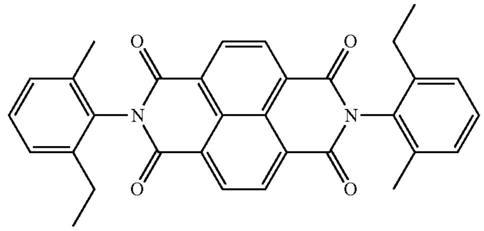

(E-7)

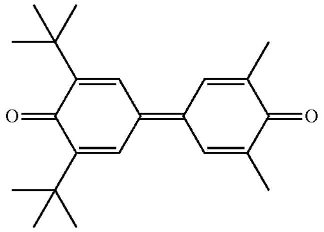

(E-8)

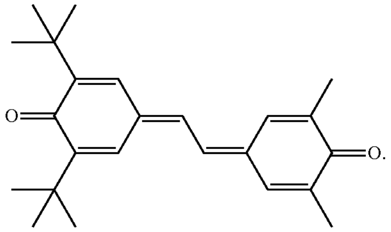

9. The electrophotographic apparatus according to claim 1, wherein the hole transporting substance contains at least one compound selected from the group consisting of a compound represented by formula (20), a compound represented by formula (21), a compound represented by formula (22), a compound represented by formula (23), and a compound represented by formula (24):

(20)

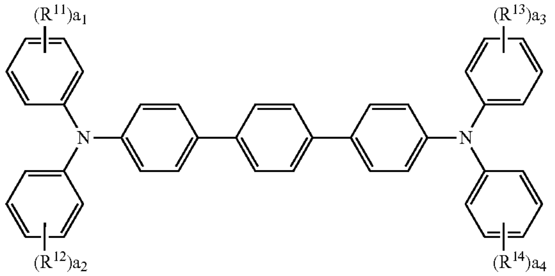

-continued (21)

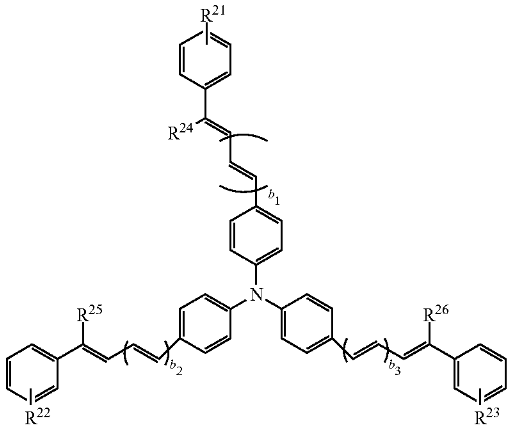

(22)

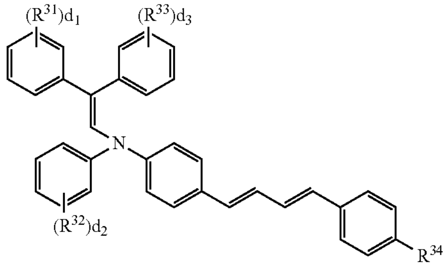

(23)

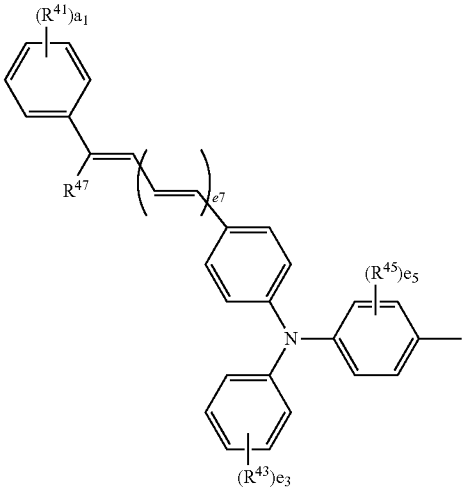

-continued

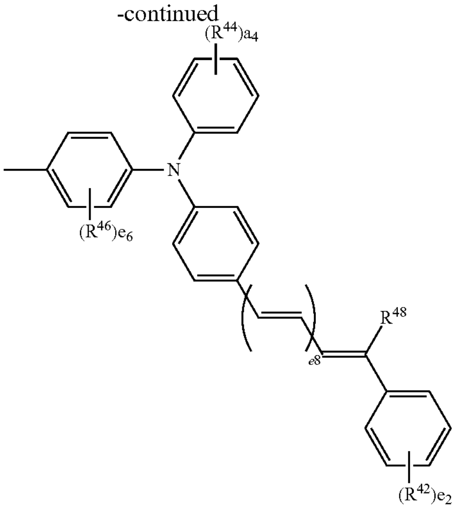

(24)

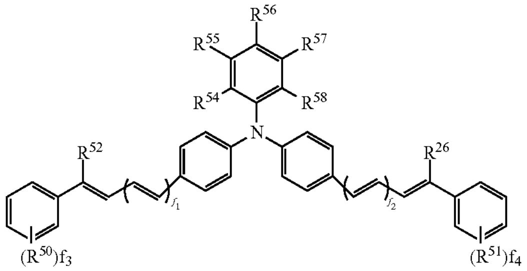

in formula (20), $R^{11}$, $R^{12}$, $R^{13}$ and $R^{14}$ each independently represent an alkyl group having 1 or more and 6 or less carbon atoms, or an alkoxy group having 1 or more and 6 or less carbon atoms, and $a_1$, $a_2$, $a_3$, and $a_4$ each independently represent an integer of 0 or more and 5 or less; in formula (21), $R^{21}$, $R^{22}$, and $R^{23}$ each independently represent an alkyl group having 1 or more and 6 or less carbon atoms, $R^{24}$, $R^{25}$, and $R^{26}$ each independently represent a hydrogen atom, or an alkyl group having 1 or more and 6 or less carbon atoms, and $b_1$, $b_2$, and $b_3$ each independently represent 0 or 1; in formula (22), $R^{31}$, $R^{32}$, and $R^{33}$ each independently represent an alkyl group having 1 or more and 6 or less carbon atoms, $R^{34}$ represents an alkyl group having 1 or more and 6 or less carbon atoms, or a hydrogen atom, and $d_1$, $d_2$, and $d_3$ each independently represent an integer of 0 or more and 5 or less; in formula (23), $R^{41}$, $R^{42}$, $R^{43}$, $R^{44}$, $R^{45}$, and $R^{46}$ each independently represent an alkyl group having 1 or more and 6 or less carbon atoms, or a phenyl group, $R^{47}$ and $R^{48}$ each independently represent a hydrogen atom, an alkyl group having 1 or more and 6 or less carbon atoms, or a phenyl group, $e_1$, $e_2$, $e_3$, and $e_4$ each independently represent an integer of 0 or more and 5 or less, $e_5$ and $e_6$ each independently represent an integer of 0 or more and 4 or less, and $e_7$ and $e_8$ each independently represent 0 or 1; and in formula (24), $R^{50}$ and $R^{51}$ each independently represent an alkyl group having 1 or more and 6 or less carbon atoms, an alkoxy group having 1 or more and 6 or less carbon atoms, or a phenyl group, $R^{52}$, $R^{53}$, $R^{54}$, $R^{55}$, $R^{56}$, $R^{57}$, and $R^{58}$ each independently represent a hydrogen atom, an alkyl group having 1 or more and 6 or less carbon atoms, an alkoxy group having 1 or more and 6 or less carbon atoms, or a phenyl group that may be substituted with an alkyl group having 1 or more and 6 or less carbon atoms, $f_1$ and $f_2$ each independently represent an integer of 0 or more and 2 or less, and $f_3$ and $f_4$ each independently represent an integer of 0 or more and 5 or less.

10. The electrophotographic apparatus according to claim 1, wherein the hole transporting substance contains at least one compound selected from the group consisting of a compound represented by formula (H-1), a compound represented by formula (H-2), a compound represented by formula (H-3), a compound represented by formula (H-4), a compound represented by formula (H-5), a compound represented by formula (H-6), a compound represented by formula (H-7), a compound represented by formula (H-8), a compound represented by formula (H-9), a compound represented by formula (H-10), and a compound represented by formula (H-11)

(H-1)

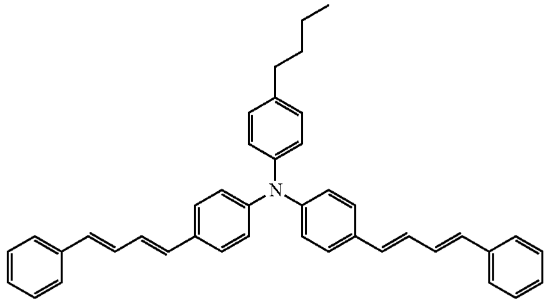

(H-2)

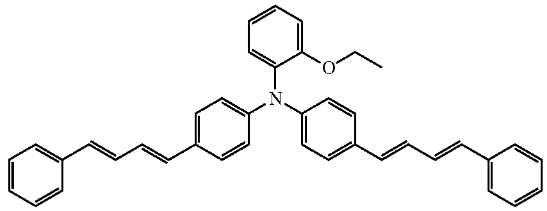

(H-3)

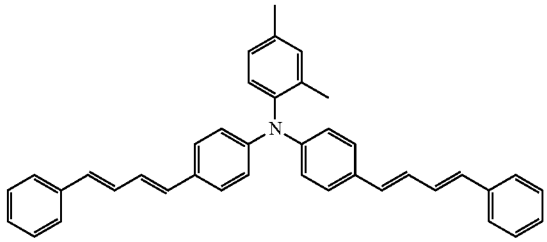

(H-4)

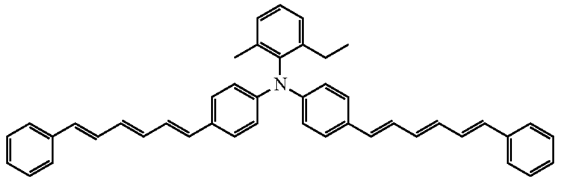

-continued (H-5)

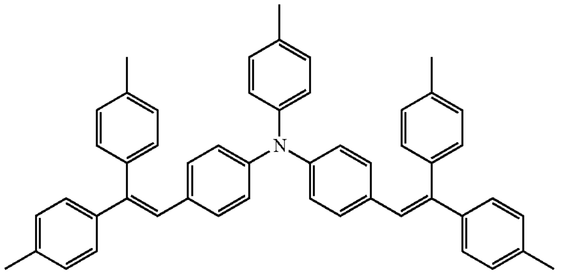

(H-6)

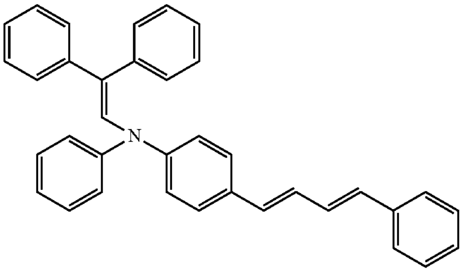

(H-7)

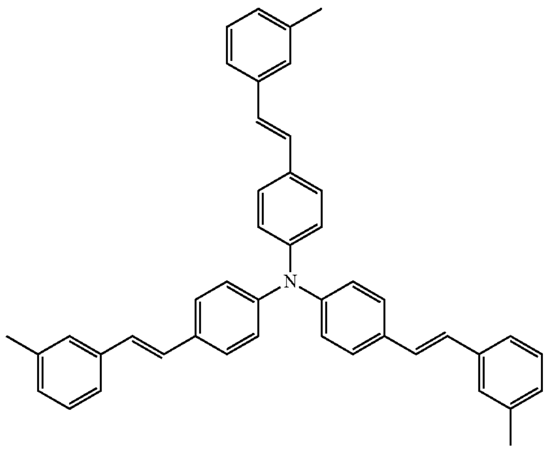

(H-8)

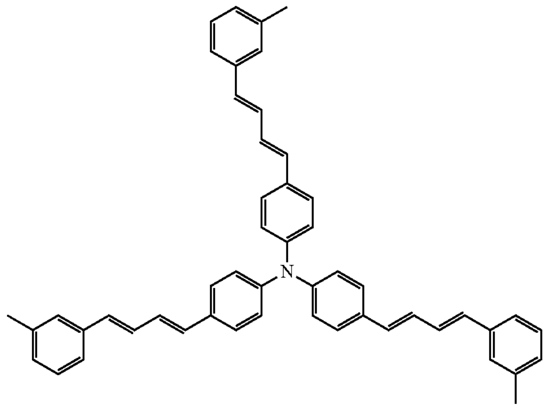

-continued (H-9)

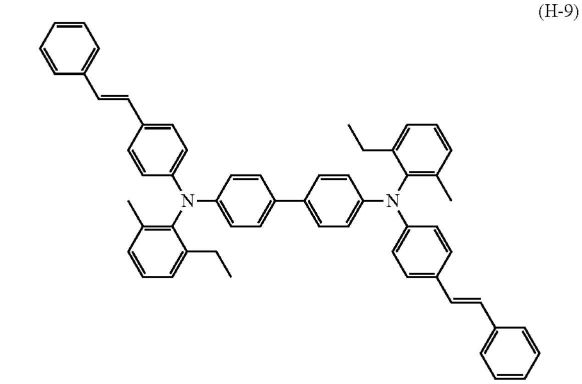

(H-10)

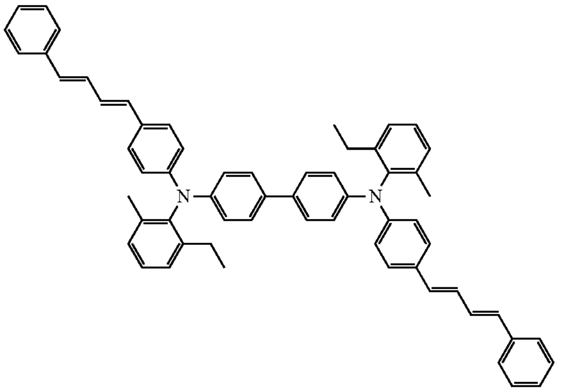

(H-11)

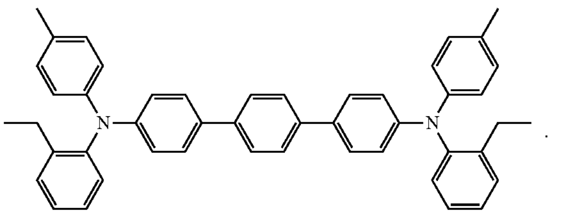

11. The electrophotographic apparatus according to claim 1, wherein the charge generating substance contains titanyl phthalocyanine.

12. The electrophotographic apparatus according to claim 1, wherein the photosensitive layer contains, as an additive, a compound represented by formula (30)

(30)

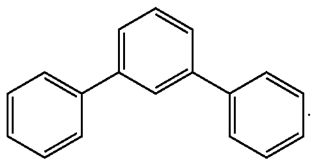

13. The electrophotographic apparatus according to claim 1, wherein the binder resin in the core contains a polyester resin.

14. The electrophotographic apparatus according to claim 1, wherein the binder resin in the core contains a styrene-acrylic resin.

15. The electrophotographic apparatus according to claim 1, wherein the toner particle contains, as an external additive, at least one particle selected from the group consisting of a silica particle, a titanium oxide particle, a strontium titanate particle, and an alumina particle.

16. A process cartridge comprising:

an electrophotographic photosensitive member; and a developing unit, which includes toner, and which is configured to form a toner image on a surface of the electrophotographic photosensitive member with the toner, the process cartridge integrally supporting the electrophotographic photosensitive member and the developing unit, and being detachably attachable onto a main body of an electrophotographic apparatus, wherein the electrophotographic photosensitive member includes a monolayer type photosensitive layer containing a charge generating substance, a hole transporting substance, an electron transporting substance, and a binder resin, wherein the photosensitive layer contains, as the binder resin, a polyarylate resin having a structural unit represented by formula (1) and a structural unit represented by formula (2), wherein the toner contains a toner particle, wherein the toner particle includes a core containing a binder resin and a shell covering a surface of the core, and wherein the shell contains at least one resin selected from the group consisting of a melamine resin, and a resin having a structural unit represented by formula (3):

(1)

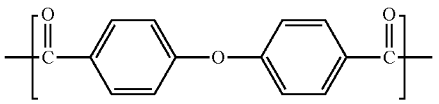

(2)

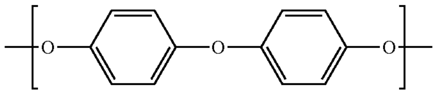

(3)

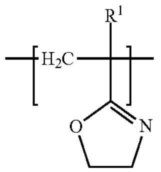

in formula (3), $R^1$ represents a hydrogen atom, or a substituted or unsubstituted alkyl group having 1 or more and 10 or less carbon atoms.

17. An electrophotographic apparatus comprising:

an electrophotographic photosensitive member;

a charging unit configured to charge a surface of the electrophotographic photosensitive member;

an exposing unit configured to irradiate the charged surface of the electrophotographic photosensitive member with light to form an electrostatic latent image on the surface of the electrophotographic photosensitive member;

a developing unit, which includes toner, and which is configured to develop the electrostatic latent image formed on the surface of the electrophotographic photosensitive member with the toner to form a toner image on the surface of the electrophotographic photosensitive member; and a transfer unit configured to transfer the toner image from the surface of the electrophotographic photosensitive member onto a transfer target member, wherein the electrophotographic photosensitive member includes a monolayer type photosensitive layer containing a charge generating substance, a hole transporting substance, an electron transporting substance, and a binder resin, wherein the photosensitive layer contains, as the binder resin, a polyarylate resin having a structural unit represented by formula (1) and a structural unit represented by formula (2), wherein the toner contains a toner particle, and wherein a surface of the toner particle contains at least one resin selected from the group consisting of a melamine resin, and a resin having a structural unit represented by formula (3):

(1)

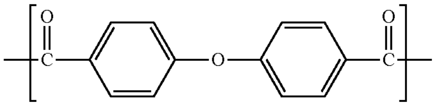

(2)

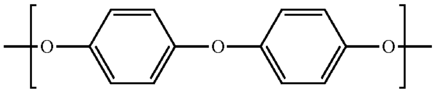

(3)

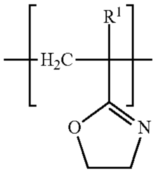

in formula (3), $R^1$ represents a hydrogen atom, or a substituted or unsubstituted alkyl group having 1 or more and 10 or less carbon atoms.

18. A process cartridge comprising:

an electrophotographic photosensitive member; and a developing unit, which includes toner, and which is configured to form a toner image on a surface of the electrophotographic photosensitive member with the toner, the process cartridge integrally supporting the electrophotographic photosensitive member and the developing unit, and being detachably attachable onto a main body of an electrophotographic apparatus, wherein the electrophotographic photosensitive member includes a monolayer type photosensitive layer containing a charge generating substance, a hole transporting substance, an electron transporting substance, and a binder resin, wherein the photosensitive layer contains, as the binder resin, a polyarylate resin having a structural unit represented by formula (1) and a structural unit represented by formula (2), wherein the toner contains a toner particle, and wherein a surface of the toner particle contains at least one resin selected from the group consisting of a melamine resin, and a resin having a structural unit represented by formula (3):

(1)

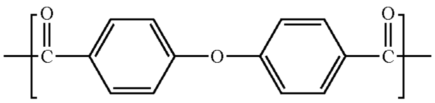

(2)

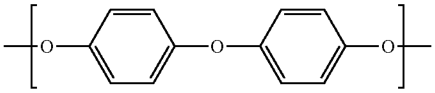

(3)

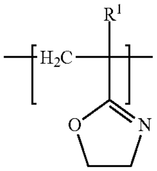

in formula (3), $R^1$ represents a hydrogen atom, or a substituted or unsubstituted alkyl group having 1 or more and 10 or less carbon atoms.

* * * * *